(12) United States Patent
Aichriedler et al.

(10) Patent No.: US 10,458,819 B2
(45) Date of Patent: Oct. 29, 2019

(54) SHAFT-INTEGRATED ANGLE SENSING DEVICE

(71) Applicant: Infineon Technologies AG, Neubiberg (DE)

(72) Inventors: Leo Aichriedler, Puch (AT); Udo Ausserlechner, Villach (AT); Peter Slama, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/507,479

(22) PCT Filed: Sep. 2, 2015

(86) PCT No.: PCT/EP2015/070053
§ 371 (c)(1),
(2) Date: Feb. 28, 2017

(87) PCT Pub. No.: WO2016/034625
PCT Pub. Date: Mar. 10, 2016

(65) Prior Publication Data
US 2017/0284836 A1    Oct. 5, 2017

Related U.S. Application Data

(63) Continuation of application No. 14/474,638, filed on Sep. 2, 2014.

(51) Int. Cl.
*G01D 11/24* (2006.01)
*G01D 5/12* (2006.01)
*G01D 5/14* (2006.01)

(52) U.S. Cl.
CPC ........... *G01D 11/24* (2013.01); *G01D 5/12* (2013.01); *G01D 5/145* (2013.01)

(58) Field of Classification Search
CPC .......... G01D 11/24; G01D 5/145; G01D 5/12
See application file for complete search history.

(56) References Cited

U.S. PATENT DOCUMENTS

| 5,252,919 | A | 10/1993 | Uemura | |
|---|---|---|---|---|
| 6,326,781 | B1 | 12/2001 | Kunde | |
| 6,489,761 | B1 | 12/2002 | Schroeder et al. | |
| 6,873,151 | B2 * | 3/2005 | Lequesne | G01D 5/145 |
| | | | | 324/205 |
| 2001/0015642 | A1 * | 8/2001 | Fischer | G01D 5/145 |
| | | | | 324/207.2 |

(Continued)

FOREIGN PATENT DOCUMENTS

DE    102006033625 A1    2/2007

OTHER PUBLICATIONS

International Search Report, PCT Application No. PCT/EP2015/070053, dated Nov. 17, 2015.

*Primary Examiner* — Huy Q Phan
*Assistant Examiner* — Zannatul Ferdous
(74) *Attorney, Agent, or Firm* — Harrity & Harrity, LLP

(57) ABSTRACT

A sensor arrangement includes a sensor element and a magnet module. The sensor element is configured to measure a magnetic field and is positioned within a shaft. The shaft is configured to shield the magnet module and the sensor element. The magnet module is configured to generate the magnetic field. The sensor element is at least partially positioned within the shaft.

20 Claims, 19 Drawing Sheets

(56) References Cited

U.S. PATENT DOCUMENTS

| | | |
|---|---|---|
| 2002/0135497 A1 | 9/2002 | Kimura et al. |
| 2005/0236219 A1 | 10/2005 | Saito |
| 2007/0103149 A1 | 5/2007 | Horie et al. |
| 2008/0164867 A1* | 7/2008 | Steinich ................ G01D 5/145 |
| | | 324/207.2 |
| 2009/0322325 A1* | 12/2009 | Ausserlechner ....... G01D 5/145 |
| | | 324/260 |
| 2011/0095658 A1 | 4/2011 | Takeuchi |
| 2011/0168466 A1 | 7/2011 | Starr |
| 2012/0038348 A1 | 2/2012 | Aimuta |

* cited by examiner

SHAFT-INTEGRATED ANGLE SENSING DEVICE

RELATED APPLICATIONS

This is a National Phase entry application of International Patent Application No. PCT/EP2015/070053 filed on Sep. 2, 2015, which claims priority from patent application U.S. Ser. No. 14/474,638 filed with the USPTO on 2 Sep. 2014 which is incorporated herein in its entirety.

BACKGROUND

Sensors are utilized in sensing systems to detect properties, such as light, temperature, motion, and the like. One type of sensor commonly used is an angle sensor based on magnetic fields. The angle sensor measures a magnetic field direction and calculates an angle based on the field direction. Other magneto-sensitive sensors measure the magnetic flux density.

However, such magnetic based sensors are susceptible to disturbances in the magnetic field. Many systems operate in harsh environments, such as automotive systems, and have components that can disturb the magnetic field and result in faulty sensor measurements.

What are needed are techniques to mitigate or prevent disturbances to enhance magnetic sensor operation, accuracy and robustness against positioning tolerances.

DETAILED DESCRIPTION

Figure 1:
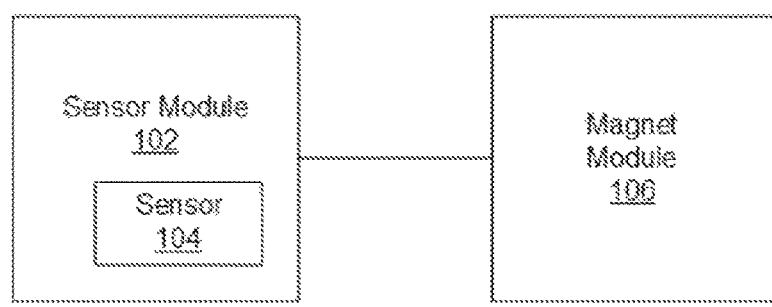
FIG. 1 is a diagram of an integrated sensor system that operates using magnetic fields.

The present invention will now be described with reference to the attached drawing figures, wherein like reference numerals are used to refer to like elements throughout, and wherein the illustrated structures and devices are not necessarily drawn to scale.

Devices, systems and methods are disclosed that facilitate angle sensors and mitigate disturbances in magnetic fields. Harsh environments, such as automotive systems, have a variety of components and conditions that impact electronics, sensors, and magnetic fields. These disturbances can result in faulty measurements, sensor failures, and require meeting position tolerances in order to achieve a certain precision level in operation of the sensor. Angle sensors are typically of interest to identify an angular position of an object rotating about an axis. In some applications it may be of interest to identify an angular position unambiguously over 180 degrees, only; i.e. half a rotation. In other applications it may however be of interest to identify an angular position unambiguously over 360 degrees, which corresponds to a full rotation the object rotation about the axis.

FIG. 1 is a diagram of an integrated sensor system 100 that operates using magnetic fields. The system 100 is provided in a simplified form in order to facilitate understanding. The system 100 can be utilized in harsh environments, automotive systems, vehicle systems, and the like. The system 100 can be fabricated into one or more devices or arrangements.

Hybrid systems, such as automotive systems, have mechanical components and electrical components. The mechanical components include engines, motors, wheels, fluids, brake systems, actuators and the like. The electrical components include sensors, processing units, control units and the like. The mechanical components can create disturbances for the electrical components. These disturbances include power surges, power loss, power traces, high power traces, vibration, debris, metal flakes/pieces, fluid contamination, transmission fluid contamination (very aggressive), break cleaner, coolant, material, dirt, and the like. The more motors, actuators, and other components, the more current and fluctuations are present.

Other approaches are susceptible to disturbances and fail to provide mechanisms against these disturbances.

Typically an angle sensor will track a rotational movement of an axis or a shaft. One approach is to add a sensor to an end of a shaft and encapsulate the sensor. However, encapsulation adds cost and additional processing and requires additional space. Additionally, such approaches also include placing a sensor element at an end of a shaft. This increases the overall length of the shaft or component attached thereto, which requires extra vehicle/engine space. Additional mounts, connectors, and the like are required to mount the sensor to the end of the shaft. These can further increase the length/space consumed and require even more vehicle/engine space.

The system 100 includes an optional sensor module 102, a sensor element 104, and a magnet module 106. The sensor module 102 may be in the form of a package or any other aid for placing the sensor 104 as will be explained further down. The system 100 may integrate the sensor module 102 with a shield in the form of a case, shaft or other component to provide self-shielding. Additionally, by being integrated, the system 100 consumes less space than other approaches. Further, the system 100 utilizes the self-shielding to permit components having lower capabilities while providing suitable or selected accuracy.

The sensor module 102 may be in some implementations an integrated component in that it is integrated in a case or other component. The sensor module 102 includes the integrated sensor element 104. The module 102 can also include power regulation components, signal generation components, memory components and the like. Although not shown, other components including mounts, fasteners, connections, housing, and the like can be included. In one example, the sensor module 102 is formed on a die having a lead frame. The sensor module 102 is enclosed in a housing using over molded plastic. Connectors to the lead frame are provided and provide external connections to the sensor module 102, as shall be explained in more detail below. The sensor module can be coupled to or incorporated into components, such as a case, lever, arm, axle leg, and the like.

The sensor element 104 measures a direction of a magnetic field or a direction of a flux of a magnetic field. The element 104 or another component then calculates a characteristic, such as angle or shaft position, based on the measurement of field direction. The sensor element 104 is configured to receive supply power, provide measurements, and/or receive control or calibration information. In one example, a single interface is used for supply power and transferring measurements. In another example, multiple wires or ports are used for power and/or communication.

The sensor element 104 is an absolute or 360 degree type sensor, meaning that it can measure flux at any angle over a full rotation uniquely. It is of a suitable type, such as magneto-resistive or magneto-sensitive types of elements.

The magnet module 106 is affixed or attached to or integrated with a component to be measured and is configured to generate a magnetic field proximate the sensor element 104. The magnet module 106 may be diametrically magnetized, in one example. The magnet module 106 can include magnets of a variety of sizes and shapes. Some example shapes include pill or solid magnets, ring magnets, and the like. The sizes are selected to provide a suitable magnetic field. Typically, the sizes include a thickness and a diameter.

Disturbances, such as those shown above, can disturb a magnetic field which is being measured by the sensor element 104. However, the sensor module 102 is integrated with a component to shield the module 102 and the element 104, without requiring extensive encapsulation or other mechanisms to mitigate the disturbances. The component providing the shielding for the sensor element 104 and the magnet module 106 includes, for example, a rotatable object, such as a shaft, rod, and the like, comprised of a suitable material. In one example the suitable material includes a relatively soft magnetic material having a permeability of greater than 1.

Figure 2:
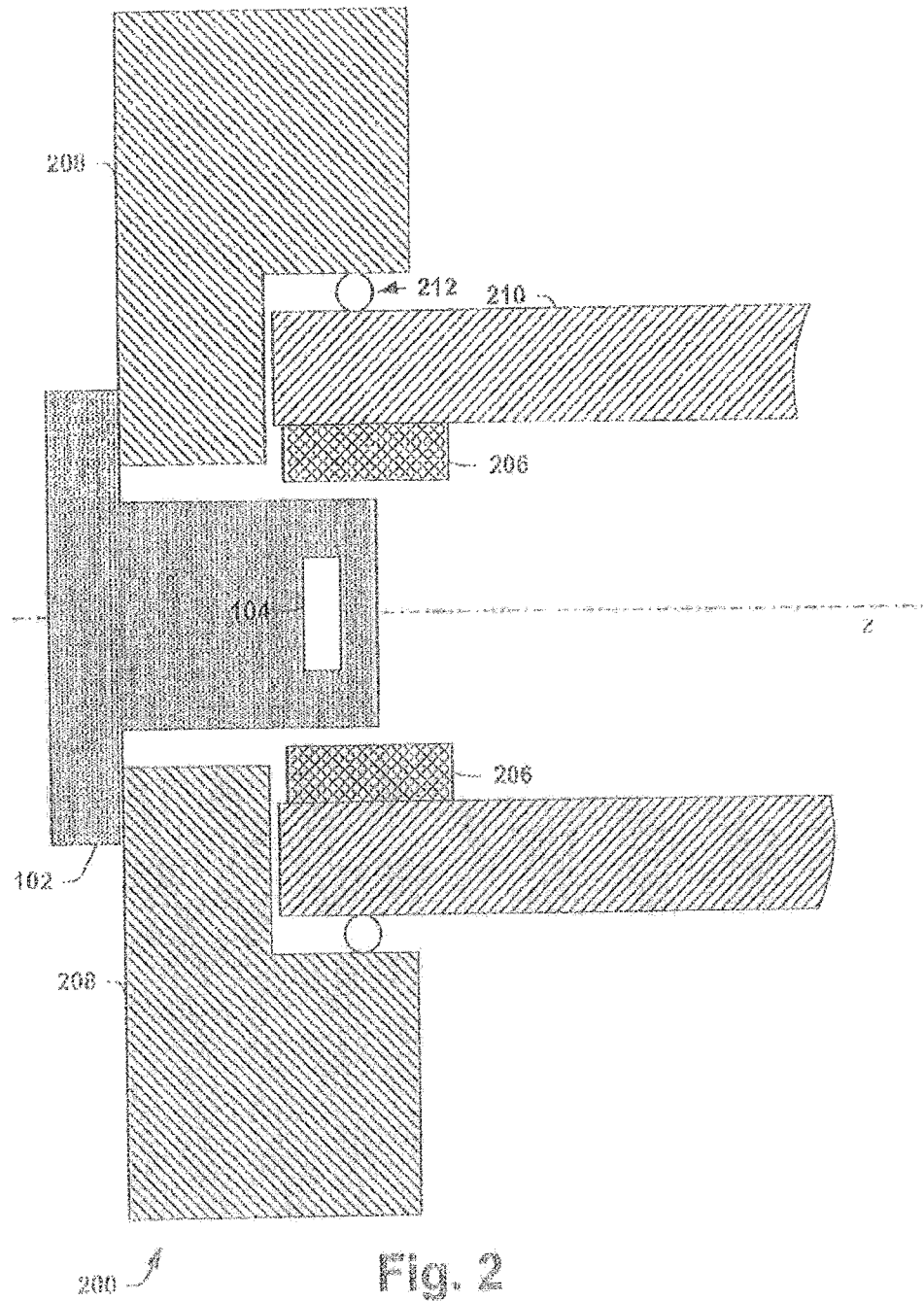
FIG. 2 is a cross sectional diagram of a shaft-integrated sensor system having a hollow shaft and a ring shaped magnet module.

FIG. 2 is a cross sectional diagram of an integrated sensor system 200 having a hollow shaft and a ring shaped magnet module. The system 200 is provided in a simplified form in order to facilitate understanding. The system 200 can be utilized in harsh environments, automotive systems, vehicle systems, and the like. The system 200 can be fabricated into one or more devices. Additional details for some of the component can be referenced from the above description of similarly numbered components.

The system 200 includes a case 208, a sensor module 102, a sensor element 104, a magnet module 206, and a shaft 210. The system 200 integrates the sensor module 102 with the shaft 210, which shields the sensor module 102 and the magnet module 206 from disturbances and enforces magnetic fields generated by the magnet module 206.

The sensor module 102 includes the sensor element 104 formed within a housing. The housing is typically an over molded plastic but not limited thereto. The sensor element 104 may be configured with a lead frame. Then module 102 includes connections from the lead frame of the sensor element 104 to ports or external connections, as will be explained in more detail with regards to FIG. 13.

The case 208 can be part of a transmission box, compartment, powertrain combustion engine, and the like. The case 208 is configured to receive and support the shaft 210. The case 208 in one embodiment includes a hollowed out recess into which the shaft 210 is inserted. Bearings 212 or another component/device are configured to facilitate rotation of the shaft 210 without excess friction. The case 208 may also include a module opening wherein a sensor module 102 is inserted or positioned. It is to be understood that the sensor module, when placed in the module opening, will facilitate an intended positioning of the actual sensor element 104 relative to the rotatable shaft 210 and a magnet 206 making rotations of the shaft 210 "visible" to the sensor element 104. It is noted that the sensor module 102 is removable from the case 208. In another example, the sensor module is irremovably attached to the case 208. In one example, the case 208 provides a hermitic seal that protects the sensor module 102 from debris and contaminants. Additionally, the case 208 can be configured to provide magnetic and/or electrical shielding. Aspects of shielding the sensor element 104 and/or the magnet 206 from any external magnetic fields will be discussed in more detail below with regards to FIGS. 10-18.

The shaft 210 is separate from the case 208. A first end of the shaft is attached to a motor or other rotatable object and a second end is proximate the case 208. The second end of the shaft 210 can be coupled to bearings to facilitate rotation. The shaft 210 can be part of an automotive system, such as a power train, transmission system, and the like. The shaft 210 is generally a long cylindrical rod comprised of a suitable material, such as a metal, soft magnetic material, and the like. Some examples of a suitable metal include steel and aluminum. An example of a soft magnetic material includes a material having a magnetic permeability of greater than 1. The shaft 210 rotates at a range of rotations per minute (RPM) and in a rotational direction, clockwise or counter clockwise. The RPM can include low RPM ranges, such as 0 to 200 RPM and high RPM ranges, such as those exceeding 4,000 RPM.

The shaft 210 is shown having an axis of rotation shown as z. The shaft 210 rotates about the axis of rotation with a rotational direction, which can be clockwise or counter clockwise.

The shaft 210 can be hollowed out, solid, or otherwise configured. In FIG. 2, the shaft 210 is hollowed and has a selected wall thickness. Alternatively the shaft 210 may be solid and comprise a thinned-wall end portion as shown in FIG. 2. At least a portion of the sensor module 102 and the sensor element 104 extends partially into the open portion of the shaft 210 at the second end. Additionally, the magnet module 206 is located at least partially within the open portion of the shaft as well. By being hollowed, the shaft can be of a lower cost and weight as compared with solid shafts.

The magnet module 206 generates a magnetic field having flux and configured for measurement. In this example, the magnet module 206 includes a ring shaped magnet positioned along an inner surface of the shaft 210, namely an inner circumferential surface in FIG. 2. The ring shaped magnet partially surrounds the sensor module 102 and surrounds the sensor element 104 with regards to the rotational axis z.

The sensor module 102 is integrated into the case 208, in this example. The sensor module 102 can include an O-ring or similar material to seal between the sensor module 102 and the case 208 (not shown in FIG. 2). The sensor element 104 is positioned proximate at a second end of the module 102. The sensor element 104 typically measures the magnetic field generated by the magnet module 206, more precisely a direction of the magnetic field when used as an angle sensor. Upon rotation of the shaft 210 the magnetic field generated by the magnet will appear to the sensor element 104 as a rotating magnetic field that may be used to monitor a rotational position of the shaft.

The measurements obtained by the sensor element 104 are used to calculate angular measurements including radial position of the shaft, angular position of the shaft, rotations per minute (RPM), direction of rotation and the like.

A control unit, such as an electronic control unit (ECU) can receive the measurements and or angular information from the sensor module 102.

Figure 3:
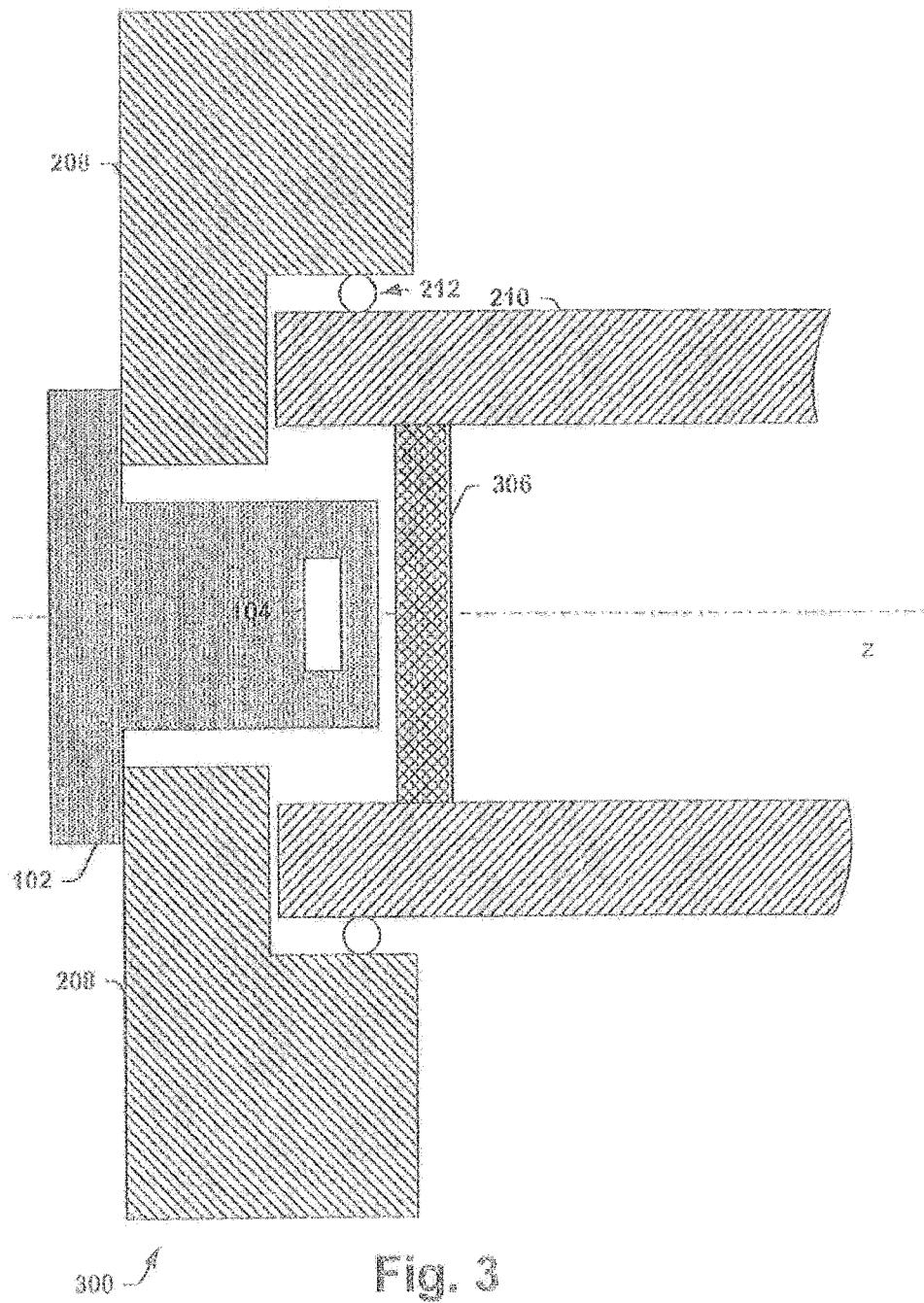
FIG. 3 is a cross sectional diagram of a shaft-integrated sensor system having a hollow shaft and a pill shaped magnet.

FIG. 3 is a cross sectional diagram of an shaft-integrated sensor system 300 having a hollow shaft or at least a thin walled end portion of the shaft and a pill shaped magnet. The system 300 is provided in a simplified form in order to facilitate understanding. The system 300 can be utilized in harsh environments, automotive systems, vehicle systems, and the like. The system 300 can be fabricated into one or more devices. The system 300 is similar to the system 200, described above, but utilizes a pill or round shaped magnet instead of a ring shaped magnet. Additional details for some of the component can be referenced from the above description of similarly numbered components.

The system 300 includes a case 208, a sensor module 102, a sensor element 104, a magnet module 306, and a shaft 210. The system 300 integrates the sensor module 102 into the shaft 210, which electrically, mechanically, and/or magnetically shields the sensor module 102 from disturbances.

The sensor module 102 includes the sensor element 104 formed within a housing. The housing is an over molded plastic. The sensor element 104 is typically configured with a lead frame. The module 102 includes connections from the lead frame of the sensor element 104 to ports or external connections.

The case 208 can be part of a power train, transmission system, and the like. The case 208 is configured to receive and support the shaft 210. The case 208 includes a hollowed out recess, referred to as a case recess, into which the shaft 210 is inserted. Bearings 212 or another component/device are configured to facilitate rotation of the shaft 210 without excess friction.

The shaft 210 is separate from the case 208. A first end of the shaft is attached to a motor or other rotatable object and a second end is proximate the case 208. The shaft 210 is generally a long cylindrical rod comprised of a suitable material, such as described above. The shaft 210 rotates at a range of rotations per minute (RPM) and in a rotational direction, clockwise or counter clockwise. The RPM can include low RPM ranges, such as 0 to 200 RPM and high RPM ranges, such as those exceeding 4,000 RPM.

The shaft 210 can be hollowed out, solid, or otherwise configured. In FIG. 3, the shaft 210 is again hollowed and has a selected wall thickness. A portion of the sensor module 102 extends partially into the open portion of the shaft 210 at the second end. The magnet module 306 is located within the open portion of the shaft.

The magnet module 306 generates a magnetic field having flux and configured for measurement. The shaft 210 enforces the generated magnetic field. In this example, the magnet module 306 includes a pill or round shaped magnet positioned across the opening in the shaft 210. The pill shaped magnet is positioned along the same axis z as the sensor module 102 and the sensor element 104. Furthermore, the pill shaped magnet has a diameter and thickness selected to provide a suitable magnetic field. The diameter can be less than a diameter of the inner surface of the shaft 210.

The sensor module 102 is integrated into the case 208, as described above. The sensor module 102 can include an O-ring or similar material to seal between the sensor module 102 and the case 208. The sensor element is positioned proximate to a second end of the module 102. The sensor element 104 measures the magnetic field, more precisely an orientation of the magnetic field generated by the magnet module 306.

The measurements obtained by the sensor element 104 are used to calculate azimuthal or angular position of the shaft, rotations per minute (RPM), direction of rotation, and the like.

A control unit, such as an electronic control unit (ECU) can receive the measurements and/or angular information from the sensor module 102.

Figure 4:
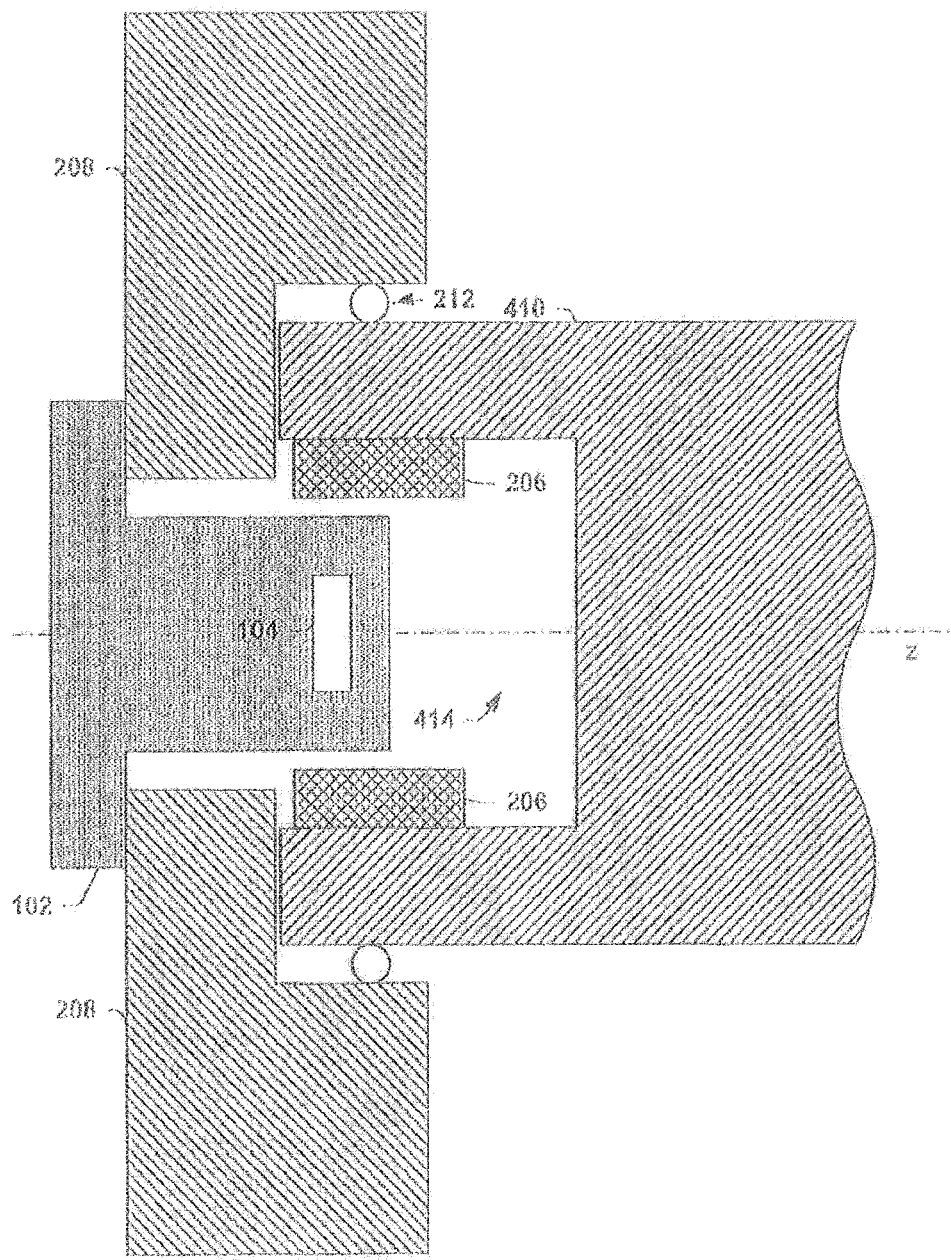
FIG. 4 is a cross sectional diagram of an integrated sensor system having a solid shaft and a ring shaped magnet module.

FIG. 4 is a cross sectional diagram of a sensor system 400 having a solid shaft 410 and a ring shaped magnet module 206. The system 400 is provided in a simplified form in order to facilitate understanding. The system 400 can be utilized in harsh environments, automotive systems, vehicle systems, and the like. Additionally, the system 400 can be fabricated into one or more devices. Additional details for some of the component can be referenced from the above description of similarly numbered components.

The system 400 includes a case 208, a sensor module 102, a sensor element 104, a magnet module 206, and a shaft 410. The system 200 integrates the sensor module 102 into the shaft 410, which electrically, mechanically, and or magnetically shields the sensor module 102 from disturbances.

The sensor module 102 again includes the sensor element 104 optionally formed within a housing. The housing, in one example, is an over molded plastic. The sensor element 104 may be configured with a lead frame. The module 102 may include connections from the lead frame of the sensor element 104 to ports or external connections.

The case 208 can be part of a power train, transmission system, and the like. The case 208 is configured to receive and support the shaft 410. The case 208 includes a hollowed out recess into which the shaft 410 is inserted. Optional Bearings 212 or another component/device is configured to facilitate rotation of the shaft 410 without excess friction.

The shaft 410 is separate from the case 208. A first end of the shaft is attached to a motor or other rotatable object and a second end is proximate the case 208. The shaft 410 is generally a long cylindrical rod comprised of a suitable material, such as a metal. Some examples of a suitable metal are shown above. The shaft 410 rotates at a range of rotations per minute (RPM) and in a rotational direction, clockwise or counter clockwise. The RPM can include low RPM ranges, such as 0 to 200 RPM and high RPM ranges, such as those exceeding 4,000 RPM.

The shaft 410, in this example, is solid and has a selected diameter. The second end of the shaft 410 includes a shaft cavity 414. The cavity 414 is formed within the second end using a suitable mechanism, such as drilling. The cavity 414 has a diameter and a depth. At least a portion of the sensor module 102 extends into the shaft cavity 414. Additionally, the magnet module 206 is located within the shaft cavity. The shaft 410, by being solid, can have superior strength as compared with hollowed shafts, as discussed with regards to FIGS. 2 and 3.

The magnet module 206 generates a magnetic field having flux and configured for measurement. In this example, the magnet module 206 includes a ring shaped magnet positioned about an inner surface of the shaft cavity 414. The ring shaped magnet partially surrounds the sensor module 102 and surrounds the sensor element 104 in z direction. The ring shaped magnet 206 typically provides a better field for measuring with regards to axial displacement than a pill shaped magnet.

The sensor module 102 is integrated into the case 208, in this example. The sensor module 102 can include an O-ring or similar material to seal between the sensor module 102 and the case 208. The sensor element is positioned proximate at a second end of the module 102. The sensor element 104 measures the magnetic field generated by the magnet module 206.

The measurements obtained by the sensor element 104 are used to calculate radial position of the shaft, rotations per minute (RPM), direction of rotation and the like. A control unit (not shown), such as an electronic control unit (ECU) can receive the measurements and or angular information from the sensor module 102.

Figure 5:
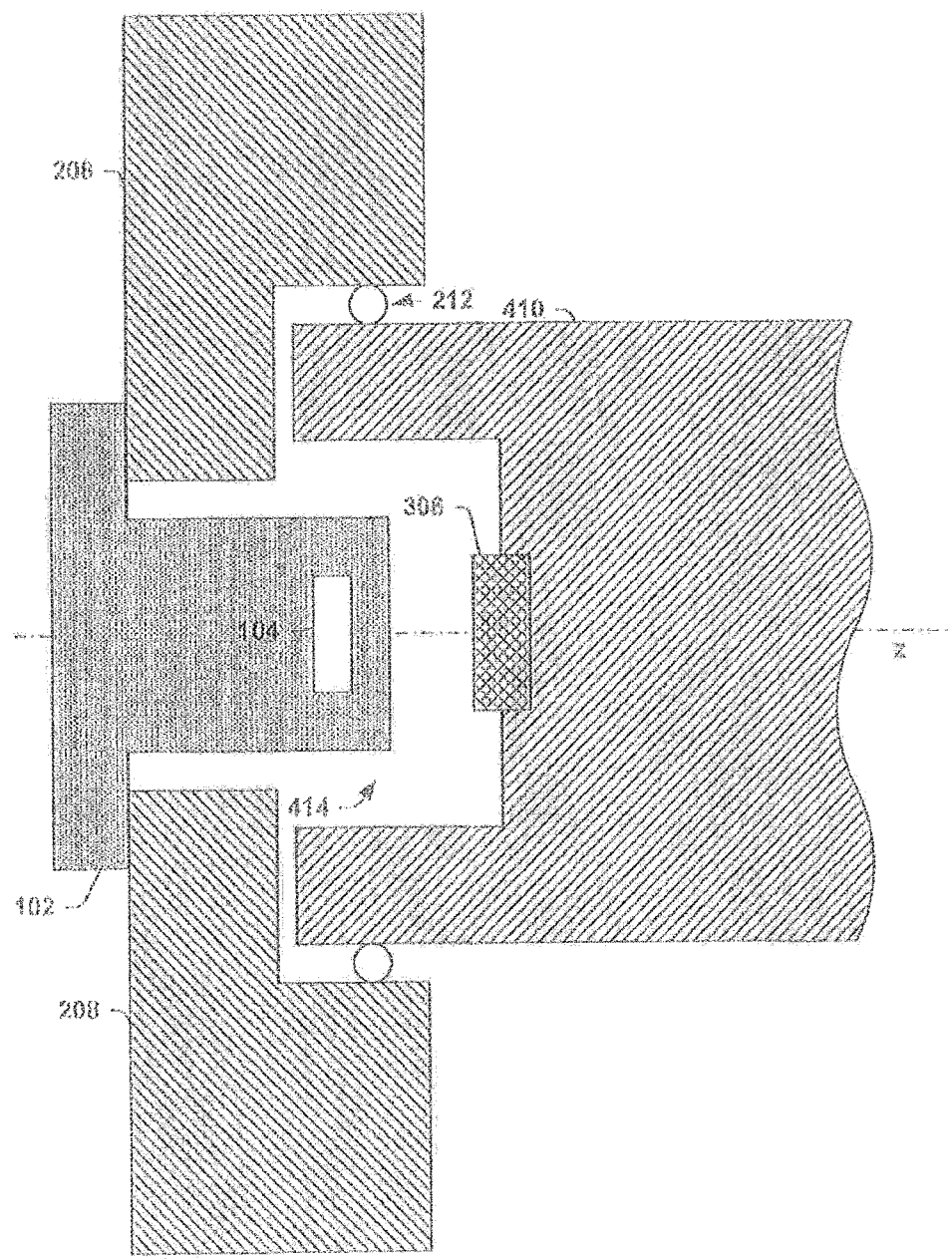
FIG. 5 is a cross sectional diagram of an integrated sensor system having a solid shaft and a pill shaped magnet.

FIG. 5 is a cross sectional diagram of an shaft integrated sensor system 500 having a solid shaft and a pill shaped magnet. The system 500 is provided in a simplified form in order to facilitate understanding. The system 500 can be utilized in harsh environments, automotive systems, vehicle systems, and the like. Additionally, the system 500 can be fabricated into one or more devices. Additional details for some of the component can be referenced from the above description of similarly numbered components.

The system 500 includes a case 208, a sensor module 102, a sensor element 104, a magnet module 306, and a shaft 410. The system 200 integrates the sensor module 102 and the magnet module 306 into the shaft 410, which electrically, mechanically, and or magnetically shields the sensor module 102 from disturbances.

The sensor module 102 includes the sensor element 104 formed within a housing. The housing is an over molded plastic. The sensor element 104 may be configured with a lead frame. The module 102 includes connections from the lead frame of the sensor element 104 to ports or external connections.

The case 208 can be part of a powertrain, transmission system and the like. The case 208 is configured to receive and support the shaft 410. The case 208 includes a hollowed out recess into which the shaft 410 is inserted. Bearings 212 or another component/device are configured to facilitate rotation of the shaft 410 without excess friction.

The shaft 410 is separate from the case 208. A first end of the shaft is attached to a motor or other rotatable object and a second end is proximate the case 208. The shaft 410 is generally a long cylindrical rod comprised of a suitable material, such as shown above. The shaft 410 rotates at a range of rotations per minute (RPM) and in a rotational direction, clockwise or counter clockwise. The RPM can include low RPM ranges and high RPM ranges and variations thereof.

The shaft 410 is solid and has a selected diameter. The second end of the shaft 410 includes a shaft cavity 414. The cavity 414 is formed within the second end using a suitable mechanism. The cavity 414 has a diameter and a depth. A portion of the sensor module 102 extends partially into the shaft cavity 414. Additionally, the magnet module 306 is located within the shaft cavity.

The magnet module 306 generates a magnetic field having flux and configured for measurement. In this example, the magnet module 306 includes a pill shaped magnet positioned in the shaft cavity 414. The pill shaped magnet is positioned on an axis with the sensor 104, namely the z axis in FIG. 5. Further, the pill shaped magnet has a diameter and thickness, as described above in regards to FIG. 3.

The sensor module 102 is integrated into the case 208 and the shaft 410, in this example. The sensor module 102 can include an O-ring or similar material to seal between the sensor module 102 and the case 208. The sensor element is positioned proximate at a second end of the module 102. The sensor element 104 measures the magnetic field or a direction of the magnetic field generated by the magnet module 206. The magnetic field from the magnet 206 is "visible" to the sensor as a rotating magnetic field indicative of an angular position of the rotating shaft 410.

The measurements obtained by the sensor element 104 are used to calculate radial position of the shaft, rotations per minute (RPM), direction of rotation and the like, as was already explained above. A control unit (not shown), such as an electronic control unit (ECU) can receive the measurements and/or angular information from the sensor module 102. The measurements or information include analog or digital raw data, calculated angle information, and the like.

Figure 6:
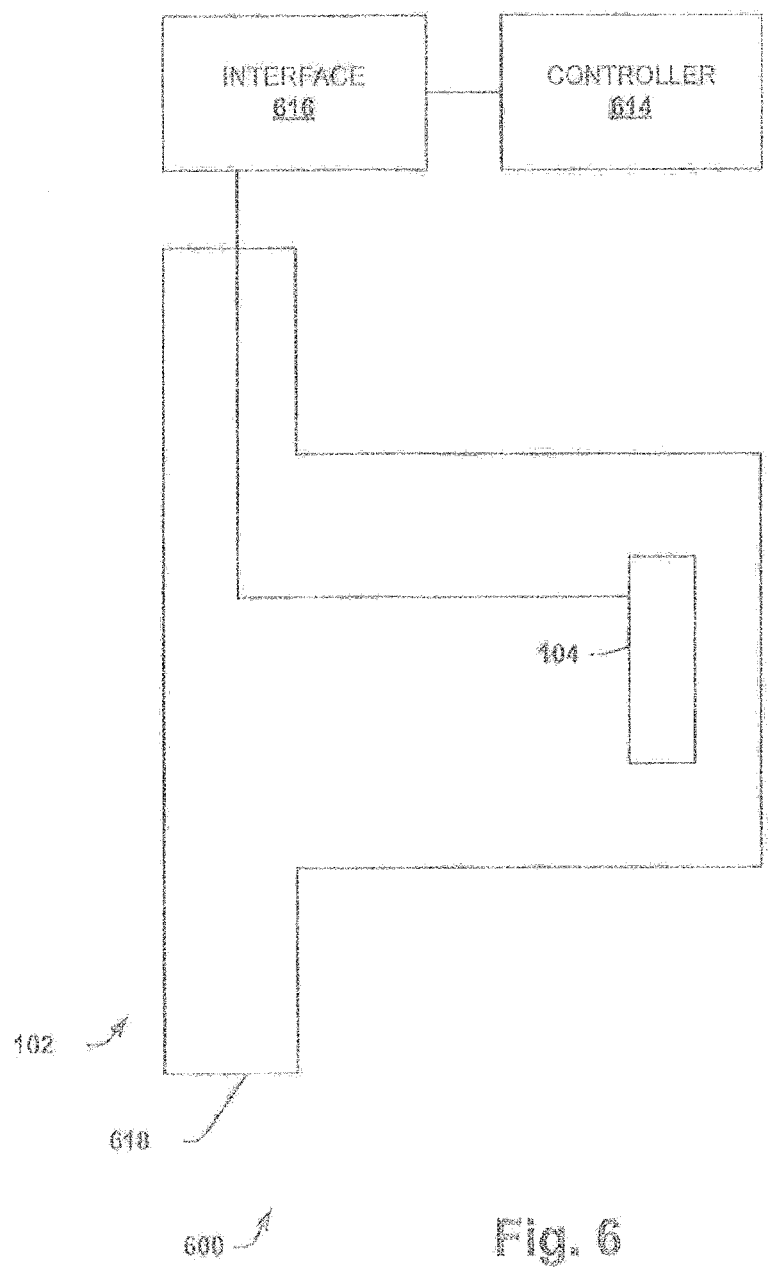
FIG. 6 is a diagram depicting a sensor module system.

FIG. 6 is a diagram depicting a sensor module system 600. The system 600 can be used with the above systems and devices and is provided to facilitate understanding.

The system 600 includes a sensor module 102, an interface 616, and a controller or control unit 614. The sensor module 102 includes a sensor element 104. The sensor element 104 is a magneto sensitive technology, such as magneto resistive, Hall effect, and the like. The sensor element 104 is configured to measure a magnetic field, magnetic flux density, magnetic field direction, and the like proximate the element 104. The sensor element 104 is formed on a die and has a lead frame for power and providing measurements.

The sensor module 102 includes a housing 618 formed of a suitable material, such as over molded plastic. The housing 618 generally seals the sensor element 104 from debris and other disturbances.

The interface 616 is connected to the sensor element 104. The interface 616 can include one or more wires/connections to the sensor element 104 and external to the housing 618. The interface 616 is configured to transfer measurement results from the sensor element 104 to the controller 614, and supply power to the sensor element 104.

The controller 614 is connected to the interface 616 and is configured to control the sensor element 104 and receive magnetic field/flux measurement results from the sensor element 104. The controller 614 determines angular information about a component, such as angle position, angular position, rotational speed, acceleration, and the like. The component is generally a rotatable component, such as a motor shaft, wheel, powertrain shaft, transmission shaft, and the like. In particular, the controller 614 is configured to determine angular position, angular direction, RPM, and the like.

Figure 7:
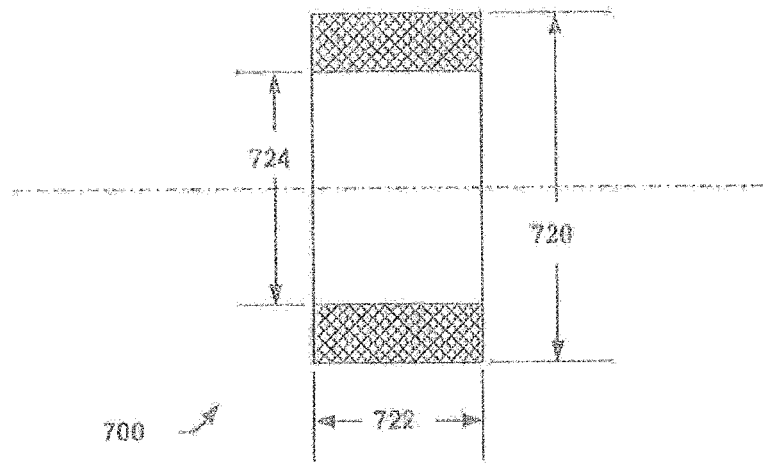
FIG. 7 is a cross-sectional diagram illustrating a ring shaped magnet that can be utilized in a magnet module, such as the magnet modules described above.

FIG. 7 is a cross sectional view of a ring shaped magnet 700 that can be utilized in a magnet module, such as the magnet modules described above. The ring shaped magnet 700 can be utilized in the above systems to generate a magnetic field for measuring angular information, including position and RPM.

The magnet 700 is positioned within an end of a shaft of a motor, wheel, and the like. The magnet generates a suitable field determined by its composition and dimensions.

The dimensions include an outer diameter 720, a width thickness 722, and an inner diameter 724. The difference between the inner diameter 724 and the outer diameter defines a ring thickness. Generally, the larger the width thickness and the ring thickness, the larger the generated magnetic field and the more tolerant the sensor element can be against displacements of the sensor relative to the magnet, also referred to as positioning tolerances.

Figure 8:
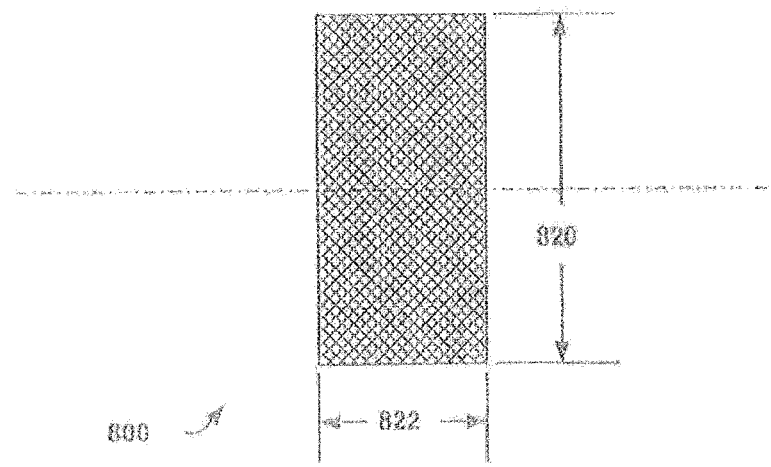
FIG. 8 is a cross-sectional view illustrating a pill or cylindrically shaped magnet that can be utilized in a magnet module, such as the magnet modules described above.

FIG. 8 is cross sectional view of a pill or round shaped magnet 800 that can be utilized in a magnet module, such as the magnet modules described above. The pill shaped magnet 800 can be utilized in the above systems to generate a magnetic field for measuring angular information, including position and RPM.

The magnet 800 may be positioned within an end of a shaft of a motor, wheel, and the like. The magnet 800 generates a suitable magnetic field distribution or flux, determined by its composition and dimensions.

The dimensions include a diameter 820 and a thickness 822. Generally, the larger the diameter 820 and the larger the thickness 822, the larger the generated magnetic field and the more tolerant the sensor element can be against positional tolerances, as shall be explained in more detail below.

Figure 9:
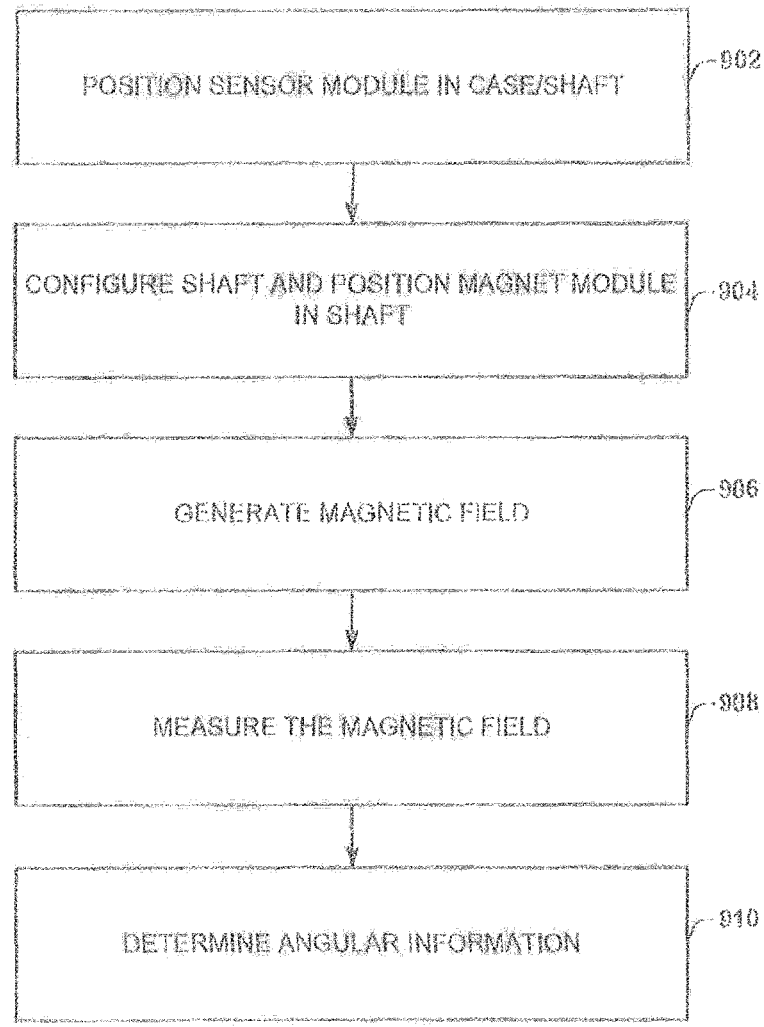
FIG. 9 is a flow diagram illustrating a method of operating a sensor device.

FIG. 9 is a flow diagram illustrating a method 900 of operating a sensor device. The method 900 inserts or integrates a sensor module into a shaft in order to provide shielding against disturbances and optionally enforces generation of a magnetic field. The method 900 can be used in conjunction with the above systems, devices and variations thereof.

The method 900 begins at block 902, wherein a sensor module is configured or positioned into a shaft and/or a case. The shaft provides shielding to the sensor module so that disturbances, such as those described above, are mitigated or avoided. The case can be a housing or wall of a compartment, such as an automotive transmission component, and the like. The sensor module may be over molded and is typically removable from the case. The sensor module includes a sensor element (magneto resistive) configured to measure magnetic fields in one, two or three axis (1D, 2D, 3D), or a direction of magnetic fields.

A shaft is configured to have a shaft recess and a magnet module is positioned within the shaft recess at block 904. The shaft recess can be formed in a solid or hollowed shaft by drilling or another suitable mechanism. The magnet module includes a magnet, such as a ring shaped magnet or a pill shaped magnet.

A magnetic field is generated by the magnet module at block 906. The magnetic field rotates with the shaft as the shaft is rotated. The magnet module is substantially shielded from disturbances by the shaft and, as a result, the magnetic field is generated without the disturbances.

The magnetic field is measured by the sensor module at block 908. The sensor module is shielded by the shaft and, as a result, is substantially shielded from disturbances. As a result, magnetic field measurements using some shielding are generally more accurate than non-shielded approaches.

Angular information is determined by a control unit based on the magnetic field measurements at block 910. The angular information includes, for example, rotational speed of the shaft, angular position of the shaft, and the like. It will be appreciated that the angular information may alternatively be derived by the sensor element and the derived angular information is being forwarded to the ECU.

Figure 10:
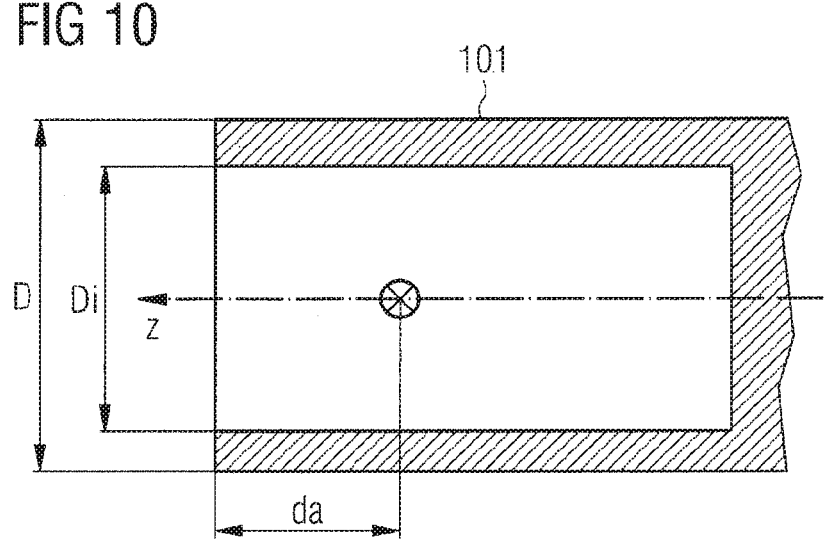
FIG. 10 is a cross-sectional view of a portion of a shaft usable in combination with sensor systems as described herein.

Contemplating a setup as in FIG. 10, it shall be discussed in the following how deep the sensor element (as discussed for example with regards to FIGS. 1-6) should preferably be inside the axis or tube 101). FIG. 10 shows cross-sectional view of a shaft 101 with a bore at its left end. A bore diameter is Di. The shaft 101 may be made of a soft magnetic material. This means that the relative permeability $\mu_r$ is greater than 100, typically between 1000 and 10000, and the coercivity is small, typically less than 1 kA/m. The magnet (see for example magnet 206 in FIGS. 2, and 4, magnet 306 in FIGS. 3 and 5, magnet ring 700 in FIG. 7, or magnetic pill 800 of FIG. 8) is not shown here because it is irrelevant for the following rule which will be given.

The sensor element 104 (not shown in FIG. 10) has a sensitive spot, which is denoted by a cross x on the rotation axis z. Irrespective of a given magnet, the sensitive spot of the magnetic field sensing element 104 (for example sensor element 104 of FIGS. 1-6, respectively) should preferable be at a distance da inside the bore, with da>0.4*Di. Under this condition, the permeable thin walled shaft end will effectively shield external magnetic fields from the sensor element 104. If the sensor element 104 is inserted more than da=0.4*Di, the shielding generally improves, yet only moderately for large da. If the sensor element 104 is inserted less than da=0.4*Di a significant portion of any external magnetic field is still present at the sensor location and may corrupt (angle) sensor function of the sensor element 104.

Figure 11A:
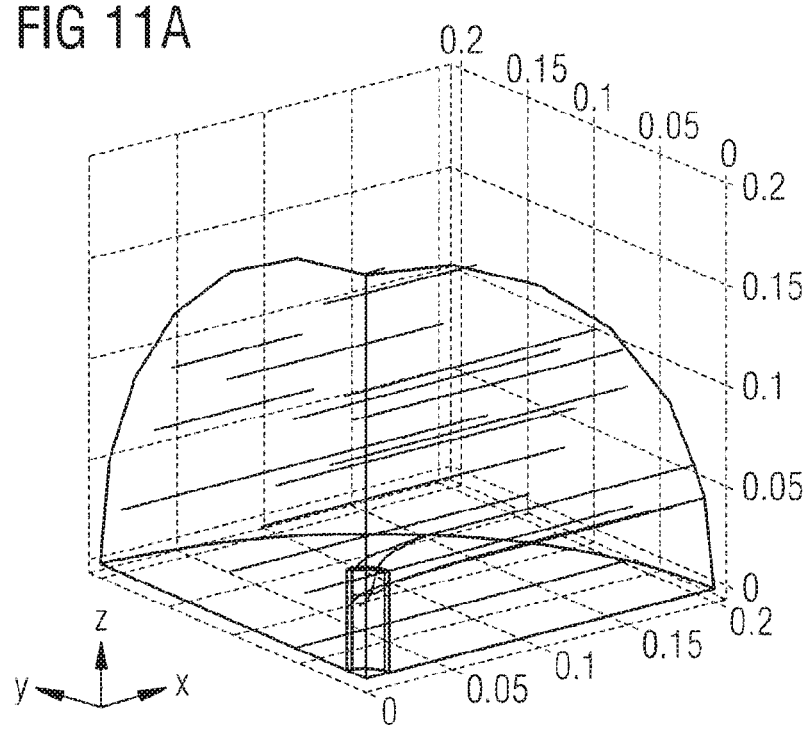
FIG. 11A illustrates a scenario used in numerical simulations.

FIG. 11A shows a configuration used for numerical simulations in order to arrive at the above estimate of insertion da of the sensor element 104 to be less than 0.4*Di into the bore of a thin-walled end portion of rotatable shaft 101. Assumed parameters in the simulation were: an inner diameter Di=22 mm of the shaft, an outer diameter of the shaft of 26 mm, a relative permeability $\mu_r$ of the axis was varied from 100 to 7400. The tube 101 extends along z-direction from z=−50 mm to +50 mm. Only ⅛-th of the geometry is modeled in FIG. 11A due to symmetry considerations. In these simulations a magnetic disturbance field in the $B_x$ direction was applied and the sensor element 104 is assumed to be sensitive to the $B_x$ component.

Figure 11B:
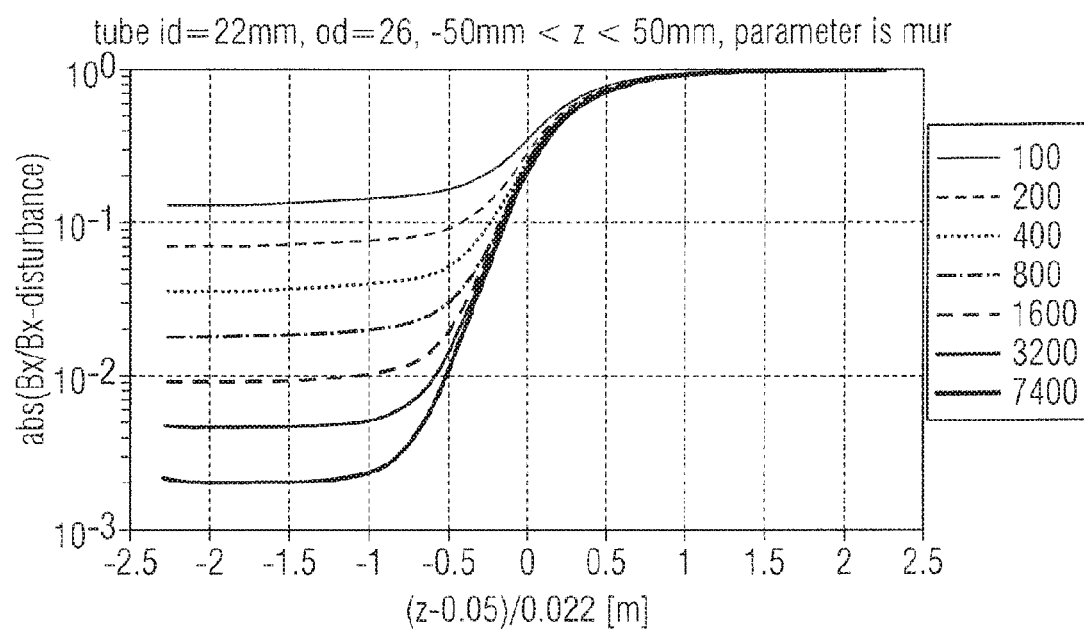
FIG. 11B illustrates some results of the simulations calculated based on the scenario illustrated in FIG. 11A.

FIG. 11B illustrates results of a simulation based on the parameters and setup as outlined in connection with FIG. 11A. In FIG. 11B a magnitude of the ratio of $B_x$ component sampled at the sensor location over the applied $B_x$ component at large distance outside the tube is plotted.

As abscissa for the plot of FIG. 11B a ratio of z-position over diameter (at z=0.05 m the tube ends) is plotted which is equal to (−1)*da/Di for the above parameters used in the simulation. The parameter that was varied in the simulation of FIG. 11B was the relative permeability $\mu_r$.

If a test point, namely the potential sensor position along the z-axis is half a diameter inside the tube 101, the shielding is quite good. Deep inside the tube 102 shielding is $$1 \bigg/ \bigg( 1 + \mu_r * \frac{d}{Di} \bigg),$$

according to Kaden "Wirbelströme and Schirmung in der Nachrichtentechnik", p. 82, wherein d denotes a wall thickness. According to FIG. 10 2*d is equal to outer diameter D−inner diameter Di).

From this formula one may deduce the following rule of thumb for the angle error, when the magnetic field sensing element is deep inside the bore:

An angle error [°]=ca. $(57/\mu r)*(Di/d)*(B_d/B_m)$, with the disturbance magnetic field $B_d$ and the magnetic field of the magnet $B_m$. Usually, the disturbance fields are up to 1.5 mT, the field of the magnet is 40 mT, and the angle error should be less than 0.2°.

Therefore one arrives at a design rule of: $\mu_r*d/Di>10$.

The relative permeability $\mu_r$ of the shield times its thickness d divided by the inner diameter should be larger than 10.

EXAMPLE

The tube 101 has 22 mm inner diameter and 2 mm wall thickness, the field of the magnet is 40 mT, and the disturbance is 1.5 mT. If the sensor is 11 mm inside the tube with $\mu_r$=800 the shielding is 3%, so the disturbance inside the tube is 0.03*1.5 mT=0.045 mT. This gives an angle error of 0.045/40*180/pi=0.065° and it holds $\mu_r*d/Di$=800*2/22=73>10.

If one reduced $\mu_r$ by a factor of 7.3, this would give a limit $\mu r*d/Di$=10 and lead to 0.065°*7.3=0.47° angle error. For better shielding larger $\mu_r$ and/or thicker wall of the tube 101 and/or smaller diameter Di of the bore are of advantage, respectively.

From the numerical simulation above, a person of ordinary skill will understand that for small $\mu_r$ the shielding is less than for large $\mu_r$—which is trivial. Yet a person of ordinary skill will further recognize that for large $\mu_r$ it is all the more of interest to insert the sensor element 104 deep enough into the bore of the shaft 101: This is to say, if the sensor element 104 was only 0.4*Di (which corresponds to the abscissa value (z−0.05)/0.022=−0.4) inserted into the bore, the shielding is pretty much the same for $\mu r$=7400 and $\mu r$=3200, yet, if the sensor element 104 was inserted by Di (which corresponds to the abscissa value (z−0.05)/0.022=−1) the $\mu_r$=7400 curve shields external fields more than 2.5 times better than for $\mu_r$=3200.

A further aspect to be considered is an effect of eddy currents and/or hysteresis, for a set-up, wherein the sensor element 104 and/or the magnet are arranged within a bore along the axis of rotation.

If the magnetic sensing element 104 is positioned along the rotation axis (which is the z-axis in FIG. 10), and the permanent magnet is attached to the rotatable shaft, there are two possibilities for shielding the magnetic sensing element 104 from external magnetic disturbances:

(i) the shield can be at rest with respect to the magnet, or (ii) magnet and shield can rotate against each other.

In case (i) the shield can be attached to the magnet or to the shaft 101, so that magnet and shield rotate synchronously around the (magnetic field) sensing element 104. In case (ii) the shield can be attached to the sensor element 104 or to a stator, such as a mounting point for the shaft, not rotating with the shaft.

It is preferred that the shield does not move relative to the magnet. Such a setup will prevent the strong field of the magnet (206 in FIGS. 2, 4, 306 in FIGS. 3, 5, 700 in FIGS. 7 and 800 in FIG. 8) to generate eddy currents inside the shield. These eddy currents should be avoided, because they produce a secondary magnetic field which leads to an angle error in the angle measurement of the sensor 104. The eddy currents lead to a magnetic field that lags behind the rotating magnetic field during rotation of the shaft, which is all the more critical the faster the rotation of the shaft 101 is.

Moreover, there is a small force between eddy currents and magnet, which could disturb, for example in the form of rotational energy being dissipated into heat.

Further, an accurate relative positioning between shield and magnet is of interest when using a shield. Assume magnet and shield are not coaxial this may distort the magnetic field sensed by the sensing element 104 and lead to angle errors. Generally, it is simpler to define an exact position between shield and magnet, if they do not move against each other. Conversely, their relative positioning is less accurate, if they rotate against each other, for instance due to clearances in the bearings.

Finally, a magnetic hysteresis of the shield may lead to additional angle errors for the measured angle. If the direction of rotation changes frequently: the shield may add small magnetic distortions to the magnetic field caused by the magnet. The magnetic distortions due to hysteresis of the magnetic shield are typically different for clockwise and counterclockwise rotation, because the hysteresis of the shield makes the total field lagging behind the field of the magnet.

In certain cases it might still be preferable to use a magnetic shield that is at rest with the sensor 104 and therefore the magnet rotates against the shield: Such a setup is of interest, if the inertia moment of the shaft 101 needs to be kept small so that one does not want to mount the shield on the shaft 101.

Further up in this disclosure the sensing element 104 was described as an integrated circuit. As an alternative the sensing element 104 may be implemented as a discrete element. Both options have their own merits, as shall be explained in more detail in the following.

An angle sensor circuit implementing the sensing element 104 typically needs at least one magnetic field sensing element to detect the rotational position of the magnet based on the (rotating) magnetic field at the sensor position. To this end one can use magneto-resistors like AMRs (anisotropic magneto-resistors), GMRs (giant magneto-resistors), TMRs (tunneling magneto-resistors), CMRs (colossal magneto-resistors), Hall plates, Vertical Hall effect devices, MAG-FETs or magneto-impedance sensor elements.

In many cases the sensor circuit needs even two or more such sensor elements in order to implement the sensing element 104, which are aligned in different directions: The different directions are: in case of magneto-resistors or Hall effect devices their reference directions (that is the current flow direction in case of AMRs, Hall effect devices, and MAGFETs, while the reference direction is a direction of pinned magnetization in case of GMR, TMR, CMR). The different directions need to be notably different, which means at least by 15° different.

In an ideal setup the different directions are different by 90°; except for AMRs, where they are 45° different. These more than one magnetic field sensing elements should be small compared to the magnet and close together (close compared to a characteristic dimension of the magnet): If the magnet has a dimension of 10 mm, all magnetic field sensing elements used to compute the angle when implementing the sensing element 104 should be within a region of <0.5 mm (i.e. 1/20-th of the magnet). As a preferred upper limit one can say: they should be not more than 1/10-th of the size of the magnet apart. Size of the magnet shall be construed in the following: The magnet arrangement is typically characterized by three spatial dimensions. Depending on circumstances the three spatial dimensions may be identical, in which case this dimension may be considered a size of the magnet. If however the three spatial dimensions of the magnet are not identical, for the remainder of this disclosure any of the three spatial dimensions may be considered representing a size of the magnet.

For implementing the sensing element 104 it is irrelevant, if only the magnetic field sensing elements are placed inside the bore 101, or if magnetic field sensing elements plus signal conditioning circuitry are placed inside the bore 101 (best seen in FIG. 10). In the first case the sensing element 104 may be implemented using discrete transducers, in the latter case the sensing element 104 may be implemented using integrated sensors.

Integrated sensors shall be construed as comprising an integrated circuit. The integrated circuit is an electronic circuit supplying power to the sensor elements and optionally conditioning their output signals e.g. by pre-amplifying and A/D-conversion and calibration versus temperature drift etc.

Depending on circumstances it may be of interest to implement the integrated sensor on a single chip or as a multiple chip solution in a common package.

TMRs are ideally suited as discrete magnetic field sensing devices, because they generate large signals, which can be transmitted over a distance of several centimeters or several tens of centimeters to a signal conditioning circuit. It is also possible to mount several chips into a single electronic package and insert this into the bore of the shaft 101.

Finally it should be mentioned that the integrated sensor, more precisely a sensor chip does not need to be aligned along the z-axis or along any pre-defined orientation inside the magnet or inside the shaft 101, if the integrated sensor implementing the sensing element 104 is a 3D-magnetic field sensor. 3D-magnetic field sensor shall be construed as a sensor that measures substantially all components of the magnetic field vector. Such a 3D-magnetic field sensor can consist of a Hall plate to detect e.g. the x-component of the magnetic field vector, a Vertical Hall effect device to detect e.g. the y-component of the magnetic field vector, plus a Vertical Hall effect device to detect e.g. the z-component of the magnetic field vector. A person of ordinary skill will readily appreciate other possible implementations of a 3D sensor which shall not be explained here for the sake of brevity.

A person of ordinary skill in the art will further appreciate that a bearing used when positioning the sensing element 104 inside the shaft 210 may have an effect on a performance of the angle sensor 104, as will be briefly discussed in the following.

Figure 12:
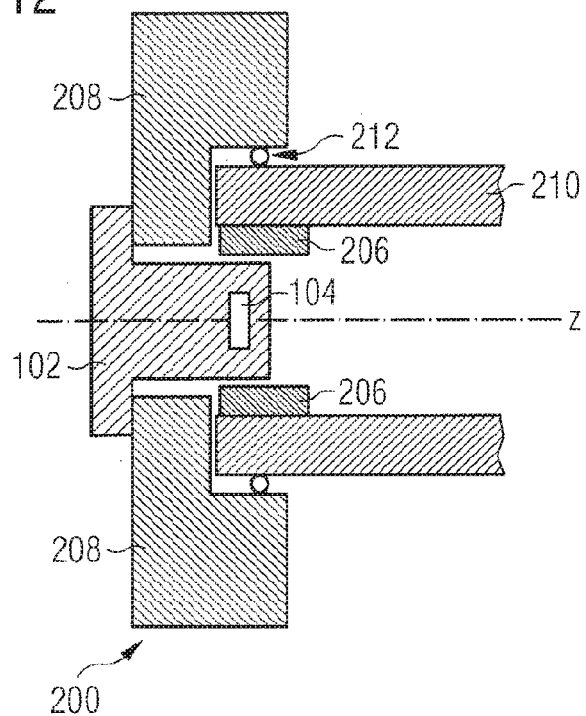
FIG. 12 illustrates an arrangement of a sensor inserted into a shaft in a cross-sectional view.

FIG. 12 illustrates a cross-sectional view of the end portion of the shaft 210 comprising a magnet 206. The bearing 212 is used to mount a case 208 which in turn helps to mount the sensor element(s) 104. Since the magnetic field sensing element(s) 104 and the magnet 206 are placed inside the bore at the end portion of the shaft 210, there is a potential risk that the sensing element(s) 104 and/or the magnet 206 interfere with the bearing 212 (e.g. ball bearing, but not limited thereto) of the shaft 210, which is usually near the end portion 210 of the shaft, too.

On one hand side the bore reduces the strength of the shaft 210. If a wall thickness ((D−Di)/2 in FIG. 10) is too low, it may happen that under heavy load the end portion of the shaft 210 deforms which can lead to the magnet 206 breaking or loosening and no longer being rigidly attached to the shaft 210. If the bearing 212 fails, it may heat up and this temperature rise may cause the magnet 206 to malfunction or to disintegrate or loosen from the end portion of the shaft 210. The bearing 212 usually employs some kind of grease to reduce friction and this grease my reach the sensor package 102 and/or the magnet 206, where it may lead to unwanted chemical interaction (e.g. reduce the strength of glue which attaches the magnet 206 to the shaft 210).

One simple remedy against these problems is to move the sensor element 104 and the magnet deeper inside the bore, which is anyhow recommended in order to improve electromagnetic shielding.

Figure 12A:
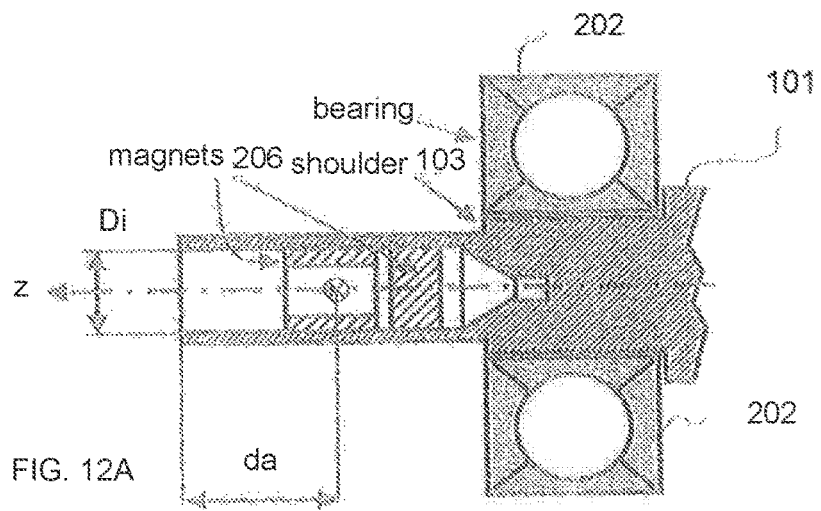
FIG. 12A illustrates a further embodiment of a sensor integrated into a bore of a shaft.

FIG. 12A illustrates a first solution to some of the issues related to the bearing as discussed before. FIG. 12A shows a cross-sectional view of an end portion of the shaft 101 parallel to an axis of rotation which is indicated as z-axis.

In FIG. 12A a bearing 212 is pulled over a shaft 101 further than in FIG. 12, this is to say the bearing is positioned further away from the bore. In the setup of FIG. 12A there are two magnets 206 producing a magnetic field at a position of the sensing element 104. Without limitation the magnets 206 may be implemented as a unitary member or comprising more than two members. The position of the sensing element 104 at a distance da away from an opening of the bore is again indicated by a cross x, as was discussed before in connection with FIG. 10.

For the arrangement of FIG. 12A force and mechanical stress experienced by the magnet 206 and caused by the bearing 212 are minimized. In other words an interaction between the bearing 212 and the magnet 206 is reduced compared to the setup as discussed in FIG. 12. A thermal coupling between the bearing 212 and the magnet(s) is minimized in the setup of FIG. 12A compared to the setup of FIG. 12. The shaft 101 may have a small shoulder 103 (e.g. $1/10^{th}$ mm in radial direction) which avoids that the thin walled part of the shaft is being damaged when the bearing 212 is pulled over the shaft 101.

Figure 12B:
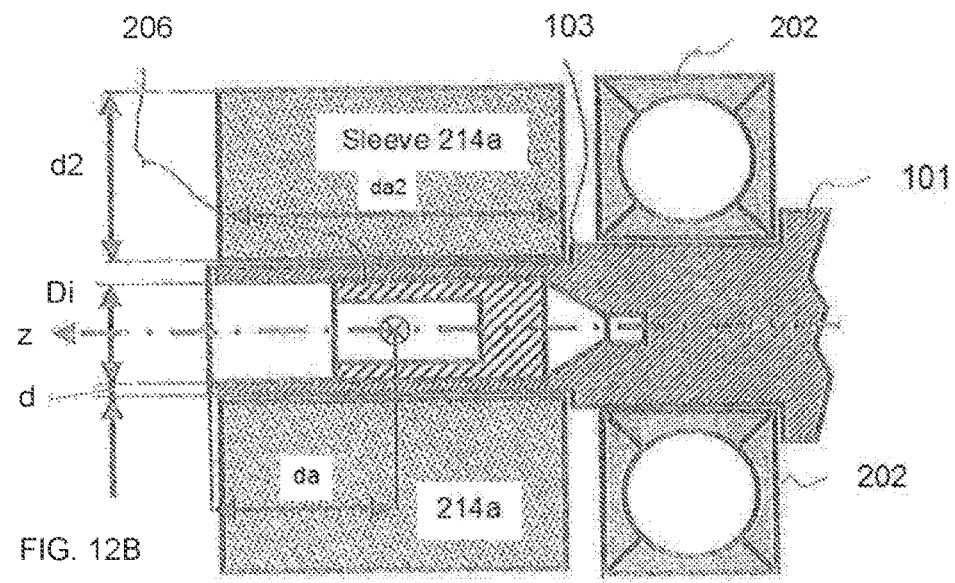
FIG. 12B illustrates another embodiment of a sensor integrated into a thin-walled end portion of a shaft with a sleeve.

FIG. 12B illustrates a situation after a sleeve 214a is mounted on to the thin walled end portion of the shaft 101 as illustrated in FIG. 12A. For the sake of brevity like elements are illustrated using like reference numerals. The implementation of FIG. 12B will improve a shielding over the arrangement of FIG. 12A due to an overall increased wall thickness at the end portion of the shaft 101:

Note that a slight eccentricity of the outer sleeve 214a (e.g. due to mounting tolerances—not shown in FIG. 12B) is most likely not to increase an angle error of the angle sensor, namely the sensing element(s) 104. This is because the inner shield formed by the thinned wall portion of thickness d is dominant. This is to say the inner shield will shield off the magnet from the outer sleeve 214a so that any interaction between magnet 206 and sleeve 214a is greatly reduced by the inner shield. It is to be noted however that the outer sleeve 214a increases shielding efficiency with regard to external magnetic disturbances.

Preferably, it should hold d2>d, i.e. the outer sleeve 214a should have a greater thickness d2 than the thin walled end portion of the shaft 101. However, even if d2>d does not hold, the outer sleeve 214a improves shielding, yet with lower efficiency.

Even more preferably, it should hold da2>da, i.e. the outer sleeve 214a is longer in axial direction than the distance da by which the magnetic field sensing element(s) 104 is inserted into the bore. However, even if this condition is not met, the outer sleeve 214a improves the shielding, yet with lower efficiency.

The sleeve 214a is preferably a soft (magnetic) material with large relative permeability $\mu_r$>10, preferably $\mu_r$>100, even more preferably $\mu_r$>1000, and again even more preferably $\mu_r$>10000. It is to be noted that the sleeve 214a can be made of a different material than the shaft 101. For sleeve 214a and shaft 101 being made of different materials, it is preferred that the sleeve 214a has larger $\mu_r$ than the shaft 101 for the following reasons: The (permanent) magnet 206 has a strong magnetization. As the magnet 206 is close to the thin walled shaft end portion of wall thickness d; the magnet 206 will also magnetize the thin walled end portion of the shaft 101. This magnetization of the thin walled shaft end portion will deteriorate shielding capacity thereof: the thin walled shaft end portion will get closer to saturation, thereby reducing its effective permeability for small superimposed external magnetic fields.

In the context of the present disclosure saturation is to be understood as substantially all magnetic moments inside a material being aligned with the (strong) net magnetic field, so that they cannot further respond to additional superimposed small magnetic fields.

As a consequence the thin walled end portion of shaft 101 cannot shield any longer against the superimposed small magnetic fields. The net effect is that those parts of the shaft 101, which are exposed to large magnetic field, are less efficient for shielding—they will act as if the wall of the thin walled end portion became even thinner in a magnetic sense. The larger a relative permeability $\mu_r$ of a material is the smaller the magnetic fields are to saturate the material.

Figure 12C:
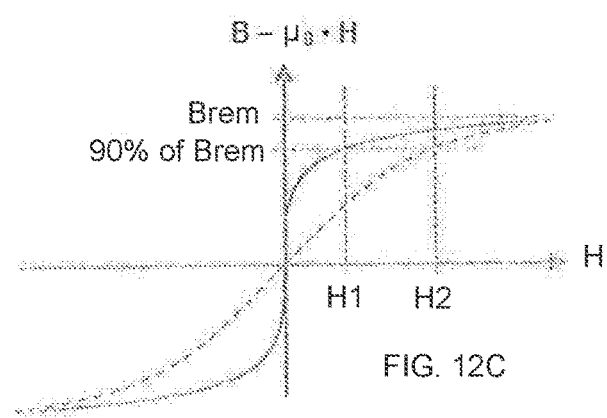
FIG. 12C illustrates saturation of a magnetiseable thin-walled end portion of a shaft as in the embodiments of FIGS. 10, 12A, and 12B.

FIG. 12C illustrates this relationship. B is the flux density in units Tesla [T], H is the magnetic field in units Ampere per meter [A/m] and $\mu 0$ is the magnetic permeability of vacuum ($=4\pi \cdot 10^{-7}$ [T]), and $B_{rem}$ is the remanence of the material which is obtained if all internal moments are aligned along the excitation H-field: the steeper the curve is near the origin H=0 the larger is the relative permeability $\mu_r$, yet this also means that the material saturates at smaller magnetic fields $H_1$<$H_2$ than for a material with smaller slope near the origin H=0, as is indicated by the dashed line in FIG. 12C for comparison.

It is further conceivable that the sleeve 214a (see FIG. 12B) is the only part which is shielding off magneto-static fields in the setup of FIG. 12B. Such a situation may occur e.g., if the shaft 101 is made of a non-magnetic material like aluminum or brass or carbon fiber, while the sleeve 214a is made of soft-magnetic material. Under such conditions the sleeve 214a will shield the magnetic field sensing element(s) 104 from external magnetic disturbance.

The shield 214a also minimizes unwanted interaction between the bearing 212 and the magnet 206. It will be appreciated that the bearing 212 has movable parts (e.g. the balls) which may be magnetic and may therefore be magnetized due to the magnetic field of the magnet 206. As a consequence the magnetized bearing 202 may generate a poorly defined magnetic field that superimposes on the field of the magnet 206 at the location of the magnetic field sensing element(s) 104 as indicated by a cross x which lies a length da inwards into the bore. The magnetized bearing 202 will therefore give rise to additional errors in the measurement of the rotational position of the shaft 101.

It will be appreciated that magnet 206 of FIG. 12B is of cylindrical shape, while the magnet of FIG. 12A comprised two individual magnets 206. In both cases the bore within the end portion of the shaft is terminated by a stud hole. Without limitation further options are conceivable and not limiting to the present disclosure.

Figure 12D:
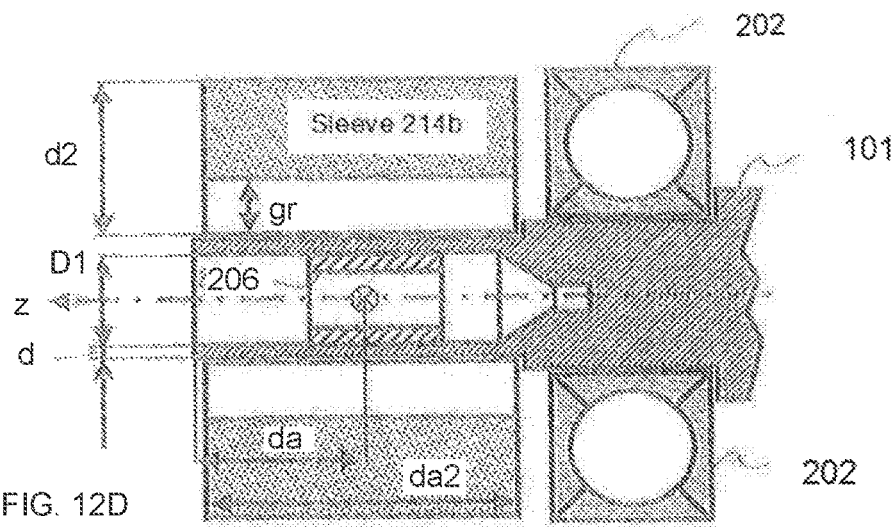
FIG. 12D illustrates another embodiment of a sensor integrated into a thin-walled end portion of a shaft with yet another sleeve.

FIG. 12D shows another arrangement similar to that discussed in relation with FIGS. 12A and B. For the sake of brevity like entities in FIG. 12D are given like reference numerals as those in FIG. 12A or 12B. The arrangement of a sensor being inserted into a bore of a thin-walled end portion of a shaft 101 of FIG. 12D notably comprises a sleeve 214b different from the sleeve 214a of FIG. 12B. The sleeve of FIG. 12D shows a gap in radial direction of width gr. The gap may conveniently be just filled with air or plastic or other non-magnetic material. The gap gr will help to improve shielding efficiency of the sleeve 214b. It will be of advantage to adjust a strength of magnet 206 to the width of the radial gap gr such that the magnetic field of the magnet 206 will not overly saturate the sleeve 214b. Such a setup will further increase the shielding efficiency of the sleeve 214b.

Figure 12E:
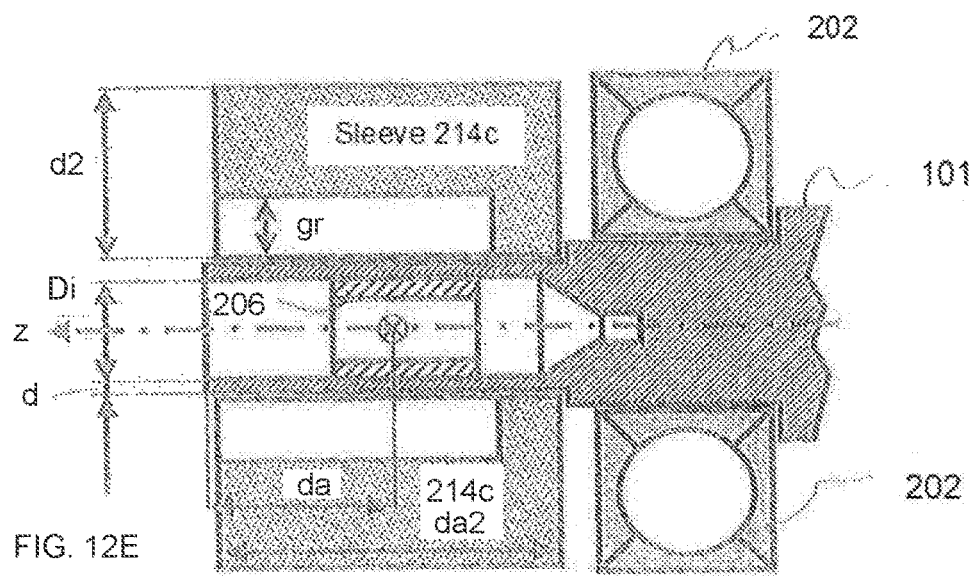
FIG. 12E illustrates another embodiment of a sensor integrated into a thin-walled end portion of a shaft with an alternative sleeve.

FIG. 12E illustrates a further variant of a sleeve 214c. The arrangement of FIG. 12E is similar to that of FIGS. 12D and 12B, and for the sake of brevity like elements are indicated using like reference numerals. While in FIG. 12D the radial gap gr of sleeve 214b extends over the full length of the sleeve 214b in axial direction, the radial gap gr of sleeve 214c of FIG. 12E extends only partially along a length of the thin walled end portion of the shaft 101. Preferably, the gap gr may extend at least over a length of the sensing elements (indicated by an x along the rotational axis, a distance da away from the opening of the bore). This way the sleeve 214 will effectively shield at least the sensing elements from any external magnetic disturbances. As for the sleeve 124b of FIG. 12D, the a strength of magnet 206 may be adjusted to a width of the radial gap gr in order to not overly saturate the sleeve 214c.

When designing an arrangement of a sensing element(s) (indicated by x in FIGS. 10, 12A, 12B, 12D, and 12E) within a thinned-wall end portion of a shaft 101, respective dimensions of individual elements may be considered in order to optimize overall performance of the arrangement.

In general an inner diameter Di of the bore 101 should be as small as possible, because this will firstly lead to smaller magnets with larger magnetic fields at a position of the magnetic field sensing element(s) for a given magnet mass (or equivalently: ratio of achievable magnetic field over cost of magnet material). Secondly, the smaller the inner bore diameter Di, the more efficiently external magnetic fields are shielded off by the thinned-wall end portion of shaft 101 and/or a sleeve 214a, 214b, 214c.

If a standard SMD sensor package is used for sensing element(s) 106 (best seen in FIG. 12 where the SMD sensor package 104 is oriented perpendicular to the rotation axis) the SMD sensor package has lateral dimensions of roughly 5 mm×6 mm. If the package is soldered to a small printed circuit board (PCB) and both are placed inside the shaft this calls for a minimum inner bore diameter of the magnet 206 of roughly 12 mm. Then the bore diameter Di of the shaft needs to be at least 16 mm and the shaft outer diameter should be at least 18-20 mm.

Figure 13:
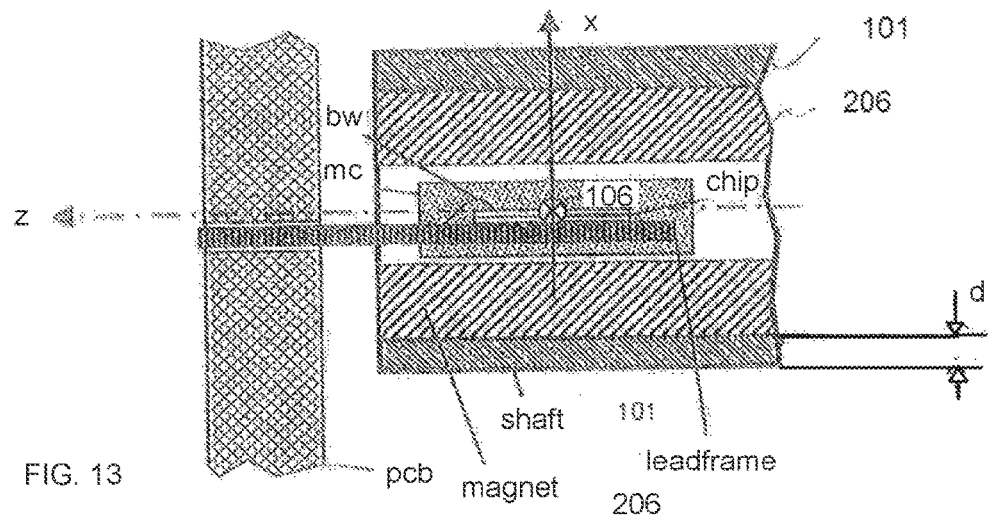
FIG. 13 illustrates a setup for a leaded sensor package.

However, for leaded sensor packages, the situation is somewhat different, as can be taken from FIG. 13: FIG. 13 illustrates a cross-sectional view through shaft 101 within the thin-walled end portion close to a position of the sensing elements 106 inside the bore of the shaft 101.

Throughout the remainder of this disclosure leaded sensor packages shall be understood as a sensor package where at least one semiconductor chip indicated as chip in FIG. 13) is mounted inside the package and covered by some protective cover such as mold compound mc known in the art. For the leaded sensor further at least two sensor leads stick out of the protective cover mc, and the sensor leads are contacted to the chip in order to be able to supply the chip with electric energy and to get an output signal of the chip. It is convenient for the leads to be directed to one side of the package (which is the open end of shaft side—left in FIG. 13).

Note that the leads might enter the protective cover mc at several faces at its perimeter—it is however useful for the leads to bend towards one side, namely the open end of shaft 101. Of course the preferred case is that all leads stick out at one face of the package. It is also not necessary that the chip(s) is/are mounted on a lead frame as illustrated in FIG. 13. The lead frame may comprise a die-paddle to which the chip is glued or mounted and leads. It is to be understood that leads are required in order to energize the sensing elements and to obtain an output of the sensor. Alternatively, simple wires may be used instead of the lead frame. It is rather to be understood that the lead frame is optional for all sensing elements discussed throughout this disclosure.

Moreover, the chip can be contacted in various ways: e.g. by bond wires (bw) as shown in FIG. 13 or by flip chip assembly on a lead frame or other means of contacting known in the art, which are not essential for the present disclosure and shall therefore not be discussed at length.

A lower limit of Di is given by the package for the magnetic field sensing element(s) plus the necessary clearance between this package and the inner bore of the magnet 206. The smallest possible semiconductor chip size in diametrical direction is about 1 mm. This gives a package size of 2.5 mm in diametrical direction. Thus, the minimum bore diameter for the magnet is 3 mm and hence the minimum bore diameter Di of the thin-walled end portion of the shaft is 5 mm. In order to maintain mechanical stability of the shaft a minimum outer diameter of the shaft is 6 mm.

Note that in FIG. 13 the magnetic field sensing elements 106 preferably detect an orientation of the magnetic field vector projected onto a plane that is perpendicular to the z-axis. The chip is typically arranged parallel to the z-axis. Consequently, the projection of the magnetic field vector onto a plane that is perpendicular to the z-axis can be decomposed into an x- and a y-component, whereby the y-component is in plane to the chip and the x-component is perpendicular to the chip.

If one now decides to use a Cartesian coordinate system with (x,y,z)-axes. Consequently, the magnetic field sensing elements 106 must be able to detect the angle between x- and y-components of the magnetic field generated by the magnet 206. This is an out-of-plane angle according to $\tan(\text{angle})=Bx/By$ (because x is perpendicular to the chip plane). Common magneto-resistive elements detect only in-plane angles (i.e. angles between y- and z-components of magnetic fields according to $\tan(\text{angle})=By/Bz$). Out-of-plane angles can be detected by a combination of at least one Hall plate and one vertical Hall effect device.

It is further to be understood that a placement of the sensing elements 106 into the bore should be as symmetrical as possible with regards to the magnet 206. Under the same token it is of interest to place the magnet 206 as symmetrical as possible within the bore.

Figure 14A:
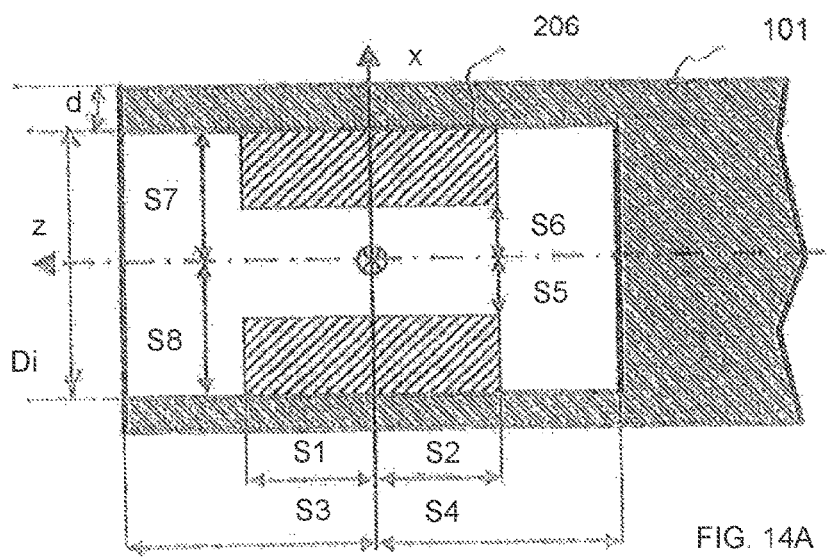
FIGS. 14A-14D illustrate symmetry considerations for magnet and sensor arrangements according to the present disclosure.

FIG. 14A illustrates a cross-sectional view of the thin-walled end portion of the shaft 101 with a cylindrical magnet 206. It is to be noted that FIG. 14A like the other drawings referred to herein may not be drawn to scale. A position of the sensing elements 106 is indicated by a cross along the z axis. In fact the position of the sensing element is chosen as origin in the setup of FIG. 14A. The magnet 206 may be placed symmetrical in z direction around the sensor position x. For such a placement the length S1 is identical to S2. If further an opening of the magnet 206 is concentric with z axis, a distance S5 is identical to a distance S6 as indicated in FIG. 14A. Should however the opening of the magnet not be concentric with an outer perimeter of the magnet 206, distance S7 may not be identical to distance S8 of FIG. 14A. It will further be understood that S5 may not be identical to S6, if the inner bore of the magnet 206 and/or a perimeter of the magnet 206 may be elliptical in shape or not circular.

Preferably, as many as possible of the above mentioned equations should substantially hold, namely S1=S2, S3=S4, S5=S6, and S7=S8. Motivation for meeting as many as possible of the above equations is the fact that a highest possible level of field homogeneity of the magnetic field may be achieved. This is a different way of saying that a maximum number of spatial derivatives of the magnetic field will vanish at the sensor position x, if the above equations are met. As a consequence of vanishing magnetic field derivatives, (assembly) tolerances in direction of the vanishing magnetic field derivative will not have an impact on an angle measurement of the sensing element 106. A person of ordinary skill will appreciate that the above symmetry considerations are made under the assumption of a substantially homogeneous magnetization of the magnet 206.

Figure 14B:
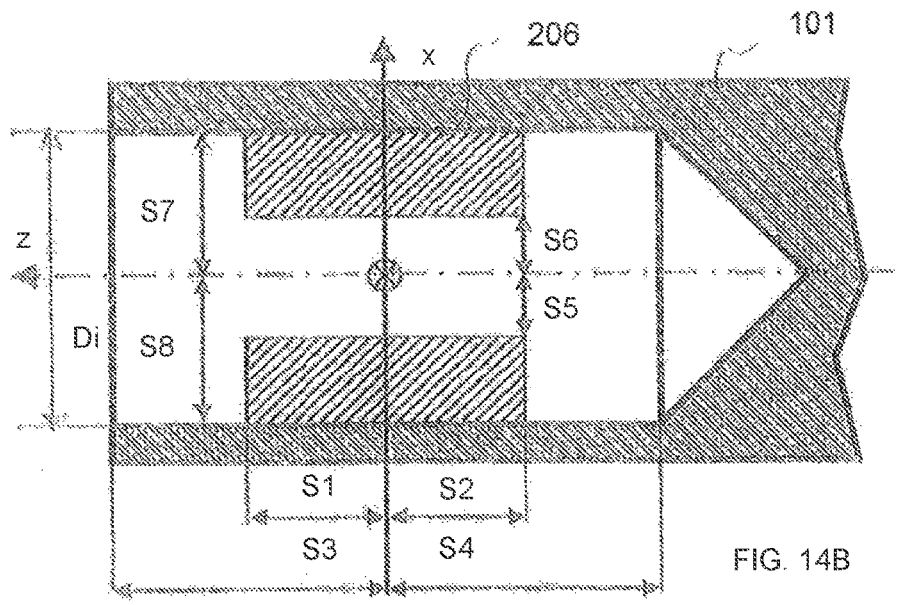
Figure 14C:
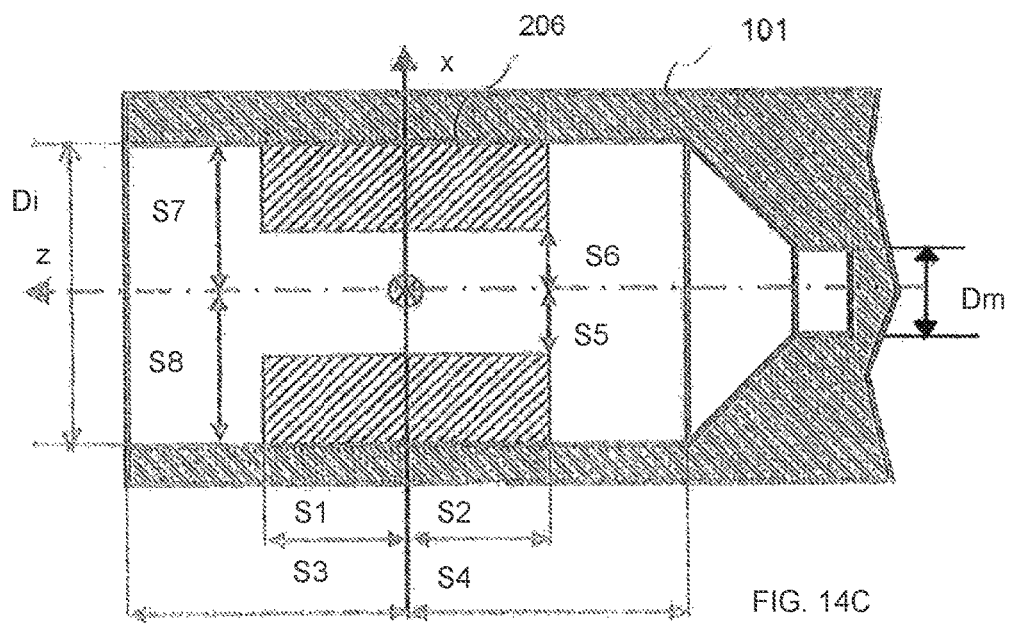
Figure 14D:
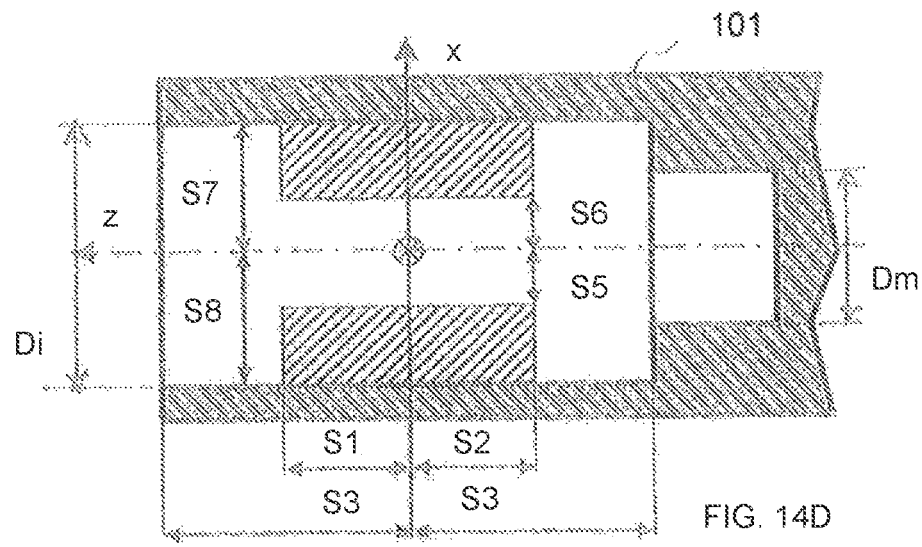

FIG. 14B-14D illustrate variants of the thin-walled end portion of the shaft 101 with magnet 206 and a length of the bore S3+S4 centered around the sensor position x. For the sake of brevity like elements are referred to using like reference numerals.

In FIG. 14B the bore terminates in a cone shaped tip, while the bore of FIG. 14C tapers from the inner diameter Di to a minimal diameter Dm, while instead the bore of FIG. 14D changes from the inner diameter Di yielding a shoulder to the minimal diameter Dm. A person of ordinary skill will appreciate ways of achieving the different forms of terminating the bore at an end facing away from the opening (in the figures depicted to the right).

It will be noted, that so far the thin-walled bore of shaft 101, the magnet 206, as well as the bore of the magnet have been considered circular when viewed along the z axis. A very large number of shapes are possible for these elements, and only a selection thereof will be discussed in the following in conjunction with FIGS. 15A-15I. These figures illustrate a cross-sectional views into the bore at the thin-walled end portion of a shaft in a plane perpendicular to the rotational z axis, respectively.

Figure 15A:
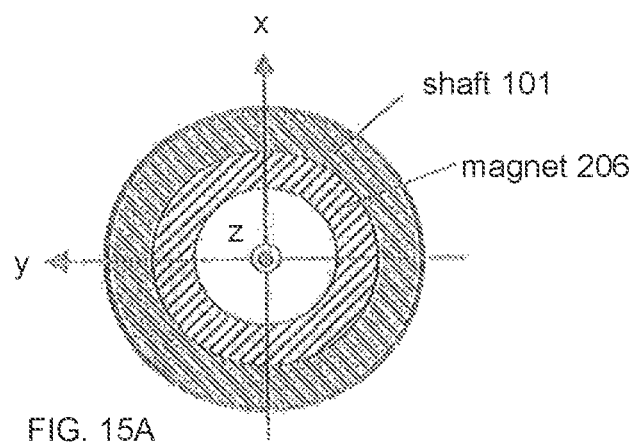
FIGS. 15A-15I illustrate various symmetries for arranging magnet(s) within a thin-walled bore at an end portion of a shaft.

FIG. 15A shows a cross section of a shaft 101 with circular outer perimeter, a circular bore and a magnet 206 with both circular outer perimeter and bore, wherein all circular bores and/or perimeters are being concentric to the rotational axis z.

Figure 15B:
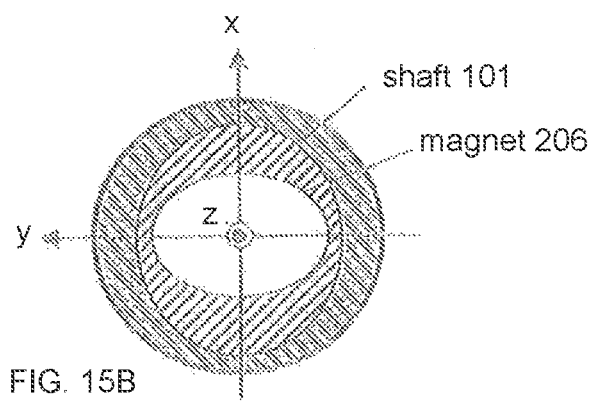

In FIG. 15B an outer perimeter of the shaft 101 is cylindrical, while a bore of the shaft 101 is elliptical, the outer perimeter of the magnet fits into the elliptical bore. Further a bore of the magnet is also elliptical, yet long and short axis of the shaft bore may not coincide with long and short axis of the elliptical bore of magnet 206. In the setup of FIG. 15B the long axis of the magnet's outer perimeter is along x-direction whereas the long axis of the magnet bore in along y-direction. Alternatively, both long axes may also be parallel or at any other angle between them.

Figure 15C:
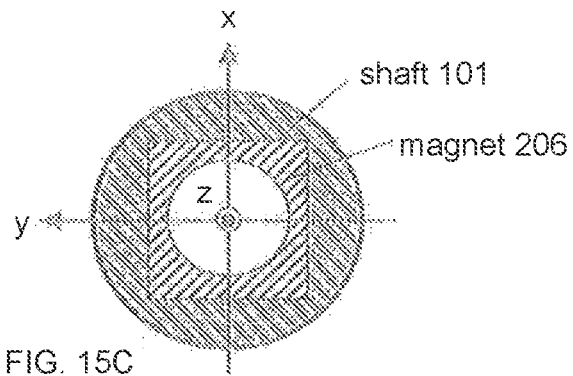

FIG. 15C shows a cylindrical shaft 101, while a bore in the thin-walled end portion of the shaft is of a square or rectangular shape. The outer perimeter of the magnet 206 is in fact matching the shape of the bore of the shaft 101. The bore of magnet 206 is of circular shape. Again all shapes are centered on the axis of rotation z, which is however not limiting the present disclosure.

Figure 15D:
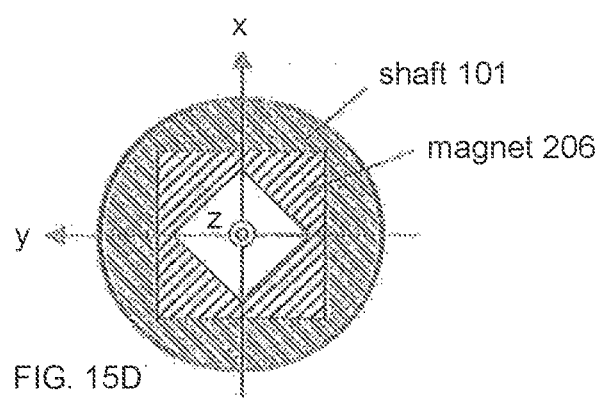

FIG. 15D is similar to FIG. 15C, yet the bore of the magnet 206 is rectangular or square shaped, instead of circular. The outer perimeter of the magnet 206 matches the rectangular shape of the bore of the shaft 101.

Figure 15E:
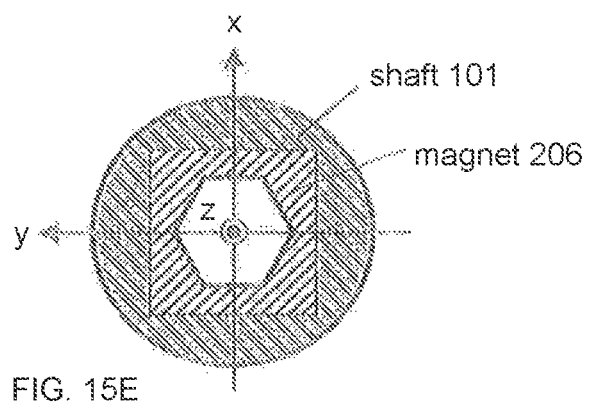

FIG. 15E is similar to FIG. 15 C or 15D. However, in FIG. 15E the bore of the magnet 206 is of hexagonal shape. Again, the outer perimeter of the magnet 206 matches the rectangular shape of the bore of the shaft 101.

Figure 15F:
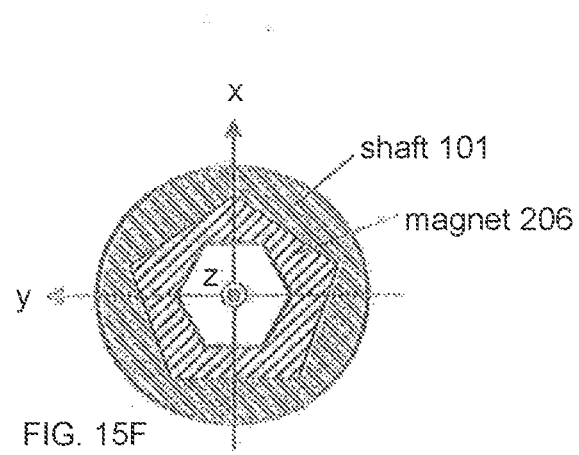

In FIG. 15F a bore of the shaft 101 is of pentagonal perimeter, while a bore of the magnet 206 is of hexagonal shape. As before an inner perimeter of the bore within shaft 101 matches an outer perimeter of the magnet 206.

Figure 15G:
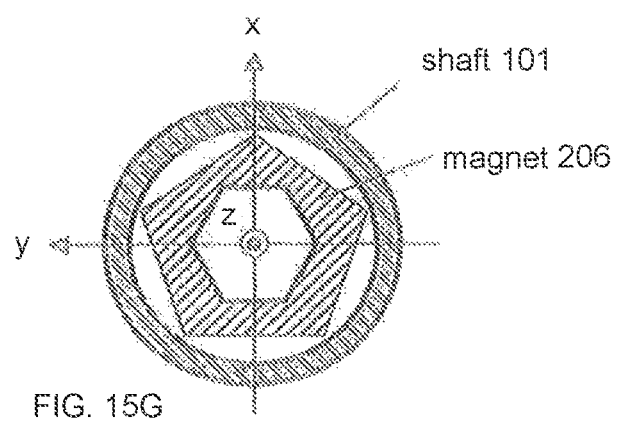
Figure 15H:
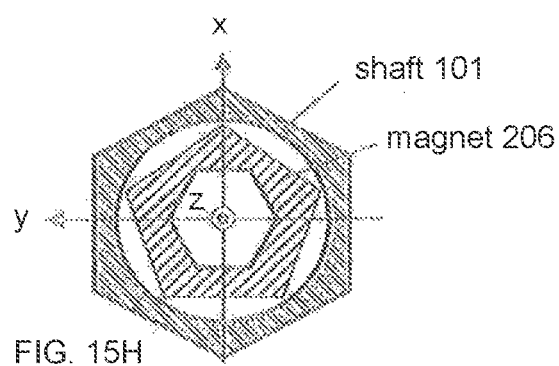
Figure 15I:
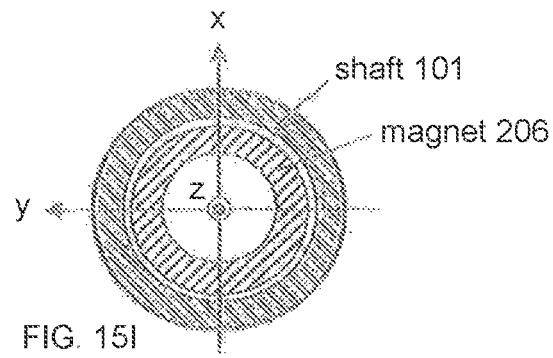
Figure 16:
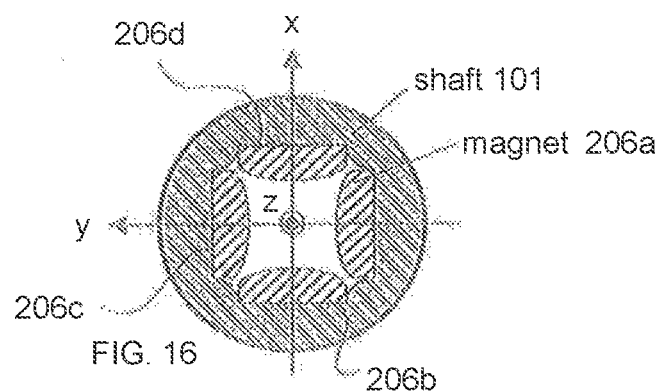
FIG. 16 illustrates a split magnet within a bore

In FIGS. 15G-15H a bore of the shaft 101 has a different geometry than an outer perimeter of magnet 206. In FIG. 15G an inner perimeter of the thin-walled end portion of shaft 101 is circular, while an outer perimeter of the magnet 206 is of pentagonal shape. Such a setup leaves some clearance between the inner perimeter of the shaft's bore and the outer perimeter of the magnet 206. The magnet 206 of FIG. 15G comprises a hexagonal bore.

In FIG. 15H an outer perimeter of the shaft 101 is not circular, but hexagonal, while a perimeter of the bore of the thin-walled end portion of the shaft 101 is of circular shape. An outer perimeter of the magnet is of pentagonal shape. As for FIG. 15H a bore of the magnet is of hexagonal shape.

In both cases of FIGS. 15G and 15H, we have a gap between the respective magnet 206 and the bore of the shaft, yet this gap has a varying width. It will be appreciated that the magnet 206 may be glued into the bore of the shaft 101 or mechanically fixed inside the bore by any suitable means.

In FIG. 5I there is a gap of constant width between the magnet 206 and the bore of the shaft 101. The gap may be filled with air or with plastic or some other material that is basically nonmagnetic, or some glue in order to fixate respective magnet 206 within the bore of shaft 101.

Without limitation a magnet 206, as discussed herein, may be decomposed into 2, 3, 4, . . . N segments, which are arranged in a pattern that has a symmetry such that when rotated around the rotation axis z by an angle 360°/N it is identical to the original shape, which may also be referred to as N-fold symmetry. A magnet 206 of N-fold symmetry is shown in cross section in FIG. 16 for the case N=4 comprising magnet segments 206a, 206b, 206c, 206d. Such a segmented magnet 206 may be for example produced by an injection molding process as is known in the art.

Figure 17:
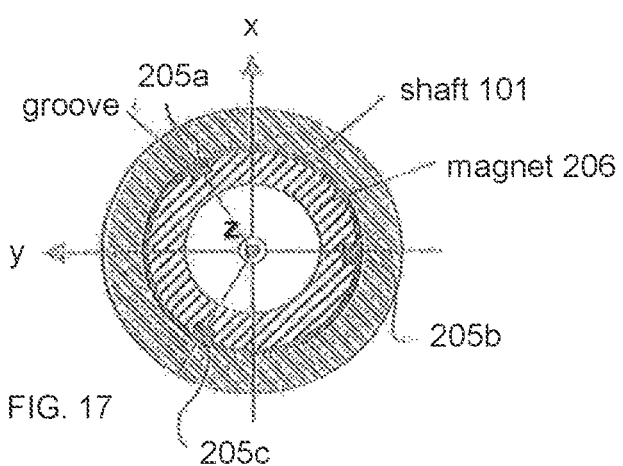
FIG. 17 illustrates a magnet comprising grooves inserted into a bore of a shaft.

A person of ordinary skill in the art will appreciate that in order to determine a rotational position of the shaft 101 based on (rotating) magnetic fields at the sensor position, it is of interest to assure a well-defined position of the magnet 206 within the bore of the shaft 101, in particular with regards to an azimuthal direction, which is the direction of rotation of the shaft 101. To this end it is convenient to provide one or more groves 205a, 205b, and 205c on the outer perimeter of the magnet 206. The grooves can be filled with glue that is used to glue the magnet into the bore of the shaft. The grooves 205a, 205b, 205c may also have the purpose to take up thermo-mechanical strain of the magnet 206 inside the bore of the shaft 101 in order to reduce mechanical stress on the magnet 206. This will help to avoid breaking of the magnet 206. While the grooves 205a, 205b, 205c are illustrated in FIG. 17 as grooves of the magnet 206, the groves may alternatively or additionally be provided on the inner perimeter of the bore (not shown in FIG. 17).

Figure 18:
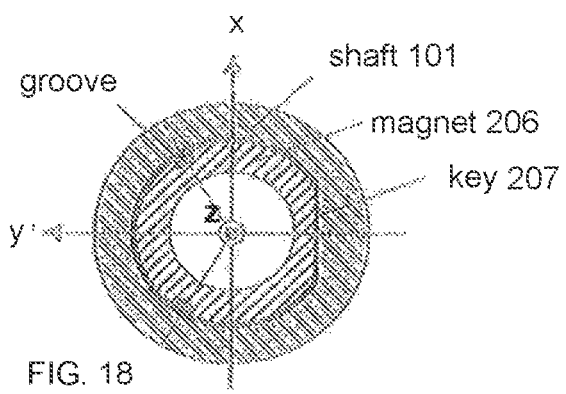
FIG. 18 illustrates a key in order to orient a magnet within a bore of a shaft.

FIG. 18 illustrates a further option of assuring a defined azimuthal position of the magnet 206 within the shaft 101. As a further option it is also possible to introduce certain unique asymmetries into the magnet and the shaft, which serve as keys 207 to define an azimuthal position of the magnet 206 relative to the shaft 101. Again FIG. 18 gives a non-limiting example of such deliberate asymmetries. Likewise the magnet could be of frustum shape in combination with a mating shape of the bore within the shaft 101.

While the method and variations thereof are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems/devices shown in FIGS. 1, 2, etc., are non-limiting examples of system that may be used to implement the above methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

A sensor arrangement includes a sensor element and a magnet module. The sensor element is configured to measure a magnetic field and is positioned within a shaft. The shaft is configured to shield the magnet module and the sensor element. The magnet module is configured to generate the magnetic field. The sensor element is at least partially positioned within the shaft.

Another sensor arrangement includes a sensor module, a case and a shaft. The sensor module is configured to measure a magnetic field. The case has a module opening and a case recess. The sensor module is positioned within the module opening. The shaft is coupled to the shaft recess and has a magnet module configured to generate the magnetic field. The shaft is configured to shield the magnet module and the sensor module.

An integrated sensor device includes a sensor module, a case and a magnet module. The sensor module is configured to measure a magnetic field. The case has a module opening and a shaft recess and is configured to shield the sensor module. The sensor module is positioned within the module opening. The magnet module is positioned within a shaft. The shaft is coupled to the shaft recess. The magnet module is configured to generate the magnetic field. The shaft is configured to shield the magnet module.

A sensor system having a sensor module, an interface, and a control unit is disclosed. The sensor module is located within a case and has a sensor element configured to provide measurements of a magnetic field. The case shields the sensor module from one or more disturbances. The interface is coupled to the shielded sensor module and configured to transfer magnetic field measurements from the shielded sensor module. The control unit is configured to determine angular information based on the magnetic field measurements.

A method of operating a sensor device is disclosed. A sensor module is configured or positioned into a case. The sensor module is shielded from one or more disturbances by the case. A shaft is configured to have a shaft recess. A magnet module is positioned within the shaft recess. The magnet module is shielded from the one or more disturbances by the shaft. A magnetic field is generated by the magnet module. The magnetic field is measured by the sensor module.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A sensor arrangement comprising:
    a rotatable shaft extending along a rotation axis and comprising a bore extending within a first shaft end portion along the rotation axis,
        the rotatable shaft being comprised of a soft magnetic material that has a relative permeability greater than one;
    a magnet module coupled to at least one face of the bore and configured to generate a magnetic field within the bore; and
    a sensing element configured to sense a rotating magnetic field caused by the magnet module upon rotation of the rotatable shaft around the rotation axis, and
    wherein the sensing element has a sensitive spot, the sensitive spot being arranged within the bore and exposed to the rotating magnetic field,
    wherein the sensitive spot is placed a distance (da) inside the bore from an opening of the bore at one end of the rotatable shaft, and
    wherein the rotatable shaft is configured such that the soft magnetic material of the rotatable shaft enforces the magnetic field generated by the magnet module at the distance (da) inside the bore and shields the sensing element from disturbances to the magnetic field generated by the magnet module.

2. The sensor arrangement of claim 1, wherein the bore has an inner diameter (Di) and the distance (da) inside the bore is substantially equal or greater than 0.4 times the inner diameter(Di).

3. The sensor arrangement of claim 1, wherein the rotatable shaft comprises a thin-walled end portion of wall thickness (d), the thin-walled end portion substantially extending in axial direction over at least a part of a length of the bore.

4. The sensor arrangement of claim 3, wherein the thin-walled end portion has a relative permeability $\mu_r$; and
    wherein a product of the relative permeability ($\mu_r$) and the wall thickness over an inner diameter (Di) of the bore is equal or greater 10.

5. The sensor arrangement of claim 1, further comprising a shielding member; and
    wherein the shielding member is fixedly mounted with respect to the magnet module or rotatably mounted with respect to the magnet module;
        the shielding member being substantially coaxially arranged with the rotation axis.

6. The sensor arrangement of claim 3, further comprising a shielding member,
    wherein the shielding member is mounted rotatably against the magnet module or is mounted fixedly with respect to the magnet module;
        the shielding member being substantially coaxially arranged with the rotation axis.

7. The sensor arrangement of claim 5, wherein the shielding member is implemented as a sleeve coaxially mounted to the rotation axis.

8. The sensor arrangement of claim 1, further comprising a bearing configured to rotatably support the rotatable shaft.

9. The sensor arrangement of claim 7, further comprising a bearing configured to rotatably support the rotatable shaft outside a thin-walled end portion of the rotatable shaft,
    wherein a wall thickness of the rotatable shaft is higher outside the thin-walled end portion of the rotatable shaft that within the thin-walled end portion of the rotatable shaft.

10. The sensor arrangement of claim 7, wherein the sleeve has a thickness (d2) in radial direction relative to the rotation axis; and
    wherein the thickness (d2) of the sleeve is substantially equal or greater than a wall thickness (d) of a thin-walled end portion of the rotatable shaft.

11. The sensor arrangement of claim 10, wherein the sleeve has a length (da2) in axial direction; and
    wherein the length (da2) is equal or larger than the distance (da) inside the bore.

12. The sensor arrangement of claim 10, wherein the sleeve comprises a gap of radial width gr over at least a portion of a length (da2) of the sleeve in axial direction.

13. The sensor arrangement of claim 1, wherein the rotatable shaft comprises at least one of aluminum, brass, or carbon fiber.

14. The sensor arrangement of claim 1, wherein the sensing element is implemented comprising at least two sensing elements selected from the group consisting of:
    an anisotropic magneto-resistor (AMR) sensing element,
    a giant magneto-resistor (GMR) sensing element,
    tunneling magneto-resistor (TMR) sensing elements,
    colossal magneto-resistor (CMR) sensing elements Hall plates,
    vertical Hall devices, a magnetic field-effect transistor (MAGFET) sensing element, and magneto impedance sensing element.

15. The sensor arrangement of claim 1, wherein the sensing element is smaller than 1/10-th of a size of the magnet module.

16. The sensor arrangement of claim 1, wherein the magnet module includes at least one magnetic member of rotational symmetry, or N-fold symmetry, with N greater 1.

17. The sensor arrangement of claim 13, wherein the sensing element is implemented as discrete transducers or integrated sensing elements.

18. The sensor arrangement of claim 1, wherein the sensing element comprises a first sensor and a second sensor arranged in a sensing element plane, the first sensor being responsive to a first magnetic field component in a direction perpendicular to the sensing element plane, while the second sensor is responsive to a second magnetic field component parallel to the sensing element plane;

the sensing element further being configured to provide at least one output signal indicative of a projection of the rotating magnetic field onto a projection plane parallel to the first magnetic field component and the second magnetic field component; and wherein the at least one output signal fully determines an angle between the projection of the rotating magnetic field and a reference direction in the projection plane.

19. The sensor arrangement of claim 1, wherein the magnet module is arranged symmetrical to the sensitive spot with regards to at least one selected from the group consisting of: the rotation axis, a radial direction with regards to the rotation axis, and an azimuthal direction with regards to the rotation axis.

20. The sensor arrangement of claim 1, wherein the magnet module is directly coupled to the at least one face of the bore.

* * * * *